US012730063B2

(12) United States Patent
Lu et al.

(10) Patent No.: US 12,730,063 B2
(45) Date of Patent: Sep. 8, 2026

(54) METHODS AND SYSTEMS FOR MONITORING FLUIDS

(71) Applicant: H2Ok Innovations Inc., Millbrae, CA (US)

(72) Inventors: David Yang Lu, Millbrae, CA (US); Annie Jieying Lu, Millbrae, CA (US); Joseph Michael Sanchez, Jr., Cambridge, MA (US); Michael Anthony Gutierrez, Sarasota, FL (US); Edward Jitong Liu, Santa Barbara, CA (US); Sophie Pesek, Cambridge, MA (US); DeMehr Thomas Haywood, Somerville, MA (US); Libby Lewanne Albanese, Boston, MA (US)

(73) Assignee: H2Ok Innovations Inc., Somerville, MA (US)

( * ) Notice: Subject to any disclaimer, the term of this patent is extended or adjusted under 35 U.S.C. 154(b) by 136 days.

(21) Appl. No.: 18/676,418

(22) Filed: May 28, 2024

(65) Prior Publication Data

US 2025/0067662 A1 Feb. 27, 2025

Related U.S. Application Data

(63) Continuation of application No. 17/537,294, filed on Nov. 29, 2021, now Pat. No. 12,038,374.

(Continued)

(51) Int. Cl.

*G01N 21/35* (2014.01)
*G01N 21/33* (2006.01)

(Continued)

(52) U.S. Cl.

CPC ............ *G01N 21/35* (2013.01); *G01N 21/33* (2013.01); *G01N 21/85* (2013.01); *G06N 20/00* (2019.01); *G01N 2201/022* (2013.01)

(58) Field of Classification Search

CPC ......... G01N 21/35; G01N 21/33; G06N 20/00

See application file for complete search history.

(56) References Cited

U.S. PATENT DOCUMENTS 3,867,630 A 2/1975 Urban
6,023,070 A 2/2000 Wetegrove et al.

(Continued)

FOREIGN PATENT DOCUMENTS

CN 108445014 A 8/2018
EP 3 578 956 A1 12/2019

(Continued)

OTHER PUBLICATIONS

International Search Report and Written Opinion dated Apr. 1, 2022, in connection with International Application No. PCT/US21/61027.

(Continued)

*Primary Examiner* — Hugh Maupin
(74) *Attorney, Agent, or Firm* — Foley & Lardner LLP

(57) ABSTRACT

Methods and systems for determining characteristics of fluids are described. A method involves illuminating a portion of a fluid by emitting light having an emission spectrum spanning at least from an infrared band to an ultraviolet band, and producing an output signal by receiving the light upon being scattered by the fluid using an optical detector. A controller may select a target sub-band of the emission spectrum based on information associated with the fluid, and may further determine a characteristic of the fluid using at least a portion of the output signal associated with the target sub-band of the emission spectrum. Alternatively, or additionally, a controller may apply an operator to the output signal, and may further determine the characteristic of the first fluid by applying a machine learning model to a result of the operator as applied to the first output signal.

22 Claims, 22 Drawing Sheets

Related U.S. Application Data

(60) Provisional application No. 63/119,384, filed on Nov. 30, 2020.

(51) Int. Cl.
*G01N 21/85* (2006.01)
*G06N 20/00* (2019.01)

(56) References Cited

U.S. PATENT DOCUMENTS 6,452,672 B1 9/2002 Trainoff
6,779,383 B2 8/2004 Lizotte et al.
7,858,035 B2 12/2010 Cronin et al.
8,429,952 B1 4/2013 Bringhurst et al.
8,617,484 B1 12/2013 Leung et al.
8,753,568 B2 6/2014 Kelly et al.
8,760,644 B2 6/2014 Seckar
9,417,122 B2 8/2016 Adam
9,464,982 B2 10/2016 Tokhtuev et al.
9,880,091 B2 1/2018 Henriksen
10,132,742 B2 11/2018 Magnussen et al.
10,197,496 B2 2/2019 Gu
10,345,321 B2 7/2019 Gerlinger et al.
10,591,388 B2 3/2020 Young et al.
10,632,507 B2 4/2020 Nabavi
12,038,374 B2 7/2024 Lu et al.
2004/0238005 A1 12/2004 Takayama
2004/0239923 A1 12/2004 Adams et al.
2009/0046287 A1 2/2009 Haught et al.
2010/0108910 A1 5/2010 Morrell et al.
2011/0259378 A1 10/2011 Skeidsvoll et al.
2014/0118731 A1 5/2014 Ayers
2016/0258870 A1* 9/2016 Tokhtuev ............... G01N 21/85
2017/0101329 A1 4/2017 Lawrence et al.
2018/0266131 A1 9/2018 Witelson et al.
2018/0275052 A1 9/2018 Walsh et al.
2019/0062178 A1* 2/2019 Bennett ................ B01D 29/902
2019/0063965 A1 2/2019 Rojo et al.
2019/0226947 A1 7/2019 Young et al.
2019/0360332 A1 11/2019 Dai et al.
2020/0200673 A1 6/2020 Coates et al.
2021/0139040 A1 5/2021 Ganiger et al.
2022/0135434 A1* 5/2022 Khan ..................... B01D 65/08 210/745
2022/0349302 A1 11/2022 Molla et al.
2023/0121472 A1 4/2023 Falzarano et al.
2023/0332933 A1* 10/2023 Shmilovich .......... B67D 1/0888
2026/0035267 A1* 2/2026 Lindstrom ............. C02F 1/008

FOREIGN PATENT DOCUMENTS

JP 2019-086496 A 6/2019
WO WO 1994/09266 A1 4/1994
WO WO 1995/06873 A1 3/1995
WO WO 2012/170743 A1 12/2012
WO WO 2014/043057 A1 3/2014
WO WO 2020/081825 A1 4/2020

OTHER PUBLICATIONS

Invitation to Pay Additional Fees dated Jan. 26, 2022, in connection with International Application No. PCT/US21/61027.
[No Author Listed], New WTW Spectral Sensors—Optimized Performance. WTW: a Xylem brand. 2011. 4 pages.
[No Author Listed], HydroShutter-HR—Anti-Fouling Shutter for HydroRad Light Collectors. HobiLabs. https://www.hobilabs.com/cms/index.cfm/37/152/901/1280/index.html.
Chapman et al, Nanofunctionalized superhydrophobic antifouling coatings for environmental sensor applications—advancing deployment with answers from nature. Advanced Engineering Materials. 2012;14(4):B175-B184.
Delauney et al., Biofouling protection for marine environmental sensors. Ocean Science, May 18, 2010; 6:503-511.
Delgado et al., Antifouling Strategies for Sensors Used in Water Monitoring: Review and Future Perspectives. Sensors. Jan. 8, 2021;21(389):1-25.
Manov et al., Methods for Reducing Biofouling of Moored Optical Sensors. J Atmospheric and Oceanic Technology. Jun. 2004; 21:958-968.
Murphy et al., A low-cost autonomous optical sensor for water quality monitoring. Talanta.Sep. 18, 2014;132(2015):520-527.
Ritchie et al., Remote Sensing Techniques to Assess Water Quality. Photogrammetric Engineering & Remote Sensing. Jun. 2003;69(6):695-704.
Extended European Search Report dated Jan. 2, 2025, in connection with European Application No. 21899188.3.
EP 21899188.3, Jan. 2, 2025, Extended European Search Report.

* cited by examiner

Emission spectrum

Servo mechanism 504
Rod 502

Rod 502
Measurement chamber 102
Copper enclosure 500

Copper enclosure 500

Copper plate 501

METHODS AND SYSTEMS FOR MONITORING FLUIDS

CROSS-REFERENCE TO RELATED APPLICATION

This application is a continuation claiming the benefit under 35 U.S.C. § 120 of U.S. application Ser. No. 17/537,294, filed Nov. 29, 2021, entitled "METHODS AND SYSTEMS FOR MONITORING FLUIDS", which claims the benefit under 35 U.S.C. § 119(e) of U.S. Application Ser. No. 63/119,384, filed on Nov. 30, 2020, entitled "SENSOR AND ANTI-FOULING MEANS," each of which is hereby incorporated herein by reference in their entirety.

BACKGROUND OF THE DISCLOSURE

Optical sensors convert light into electric signals. An optical sensor detects light and then translates it into a form that is readable by an instrument. An optical sensor is generally part of a larger system that integrates an optical source, a measuring device and the optical detector. These components are often connected to an electrical trigger. Optical sensors are used in a variety of applications, including in ambient light sensing, biomedical sensing, liquid level indicators, telecom and datacom, smartphones, imaging devices and solar cells, among others.

SUMMARY OF THE DISCLOSURE

Some embodiments relate to a method for determining a characteristic of a fluid, comprising: illuminating a portion of a fluid by emitting, using a broadband optical source, light having an emission spectrum with a bandwidth in excess of 100 nm; producing an output signal by receiving the light upon being scattered by the fluid using an optical detector; selecting a target sub-band of the emission spectrum based on information associated with the fluid; and determining the characteristic of the fluid using at least a portion of the output signal associated with the target sub-band of the emission spectrum.

In some embodiments, the emission spectrum spans at least from an infrared band to an ultraviolet band.

In some embodiments, determining the characteristic of the fluid using the portion of the output signal associated with the target sub-band comprises disregarding spectral content outside the target sub-band.

In some embodiments, selecting the target sub-band of the emission spectrum based on information associated with the fluid comprises using a machine learning model.

In some embodiments, determining the characteristic of the fluid comprises determining a color and/or a turbidity of the fluid.

In some embodiments, determining the characteristic of the fluid comprises determining a concentration and/or a classification of a target substance.

In some embodiments, the method further comprises applying an operator to the output signal; and determining a further characteristic of the first fluid by applying a machine learning model to a result of the operator as applied to the output signal.

In some embodiments, the machine learning model is trained using spectra obtained by illuminating fluids having different characteristics.

Some embodiments relate to an optical monitoring apparatus for determining a characteristic of a fluid, comprising: a broadband optical source configured to emit light having an emission spectrum with a bandwidth in excess of 100 nm; an optical detector configured to produce an output signal by receiving the light upon being scattered by the fluid; and a controller configured to: select a target sub-band of the emission spectrum based on information associated with the fluid; and determine the characteristic of the fluid using a portion of the output signal associated with the target sub-band of the emission spectrum.

In some embodiments, the emission spectrum spans at least from an infrared band to an ultraviolet band.

In some embodiments, determining the characteristic of the fluid using the portion of the output signal associated with the target sub-band comprises disregarding spectral content outside the target sub-band.

In some embodiments, selecting the target sub-band of the emission spectrum based on information associated with the fluid comprises using a machine learning model.

In some embodiments, determining the characteristic of the fluid comprises determining a color and/or a turbidity of the fluid.

In some embodiments, determining the characteristic of the fluid comprises determining a concentration and/or a classification of a target substance.

In some embodiments, the controller is further configured to: apply an operator to the output signal; and determine a further characteristic of the first fluid by applying a machine learning model to a result of the operator as applied to the output signal.

In some embodiments, the machine learning model is trained using spectra obtained by illuminating fluids having different characteristics Some embodiments relate to an optical monitoring apparatus, comprising a housing removably attachable to a pipe having a sight glass, the housing defining a first cavity, the housing comprising: a first housing member and a second housing member; and a latching mechanism configured to latch the first housing member to the second housing member; and a spectral optical sensor comprising: an optical source disposed in the first cavity, the optical source being aligned with the sight glass when the first housing member is latched to the second housing member with the pipe passing therebetween; and an optical detector.

In some embodiments, the optical sensor is disposed in the first cavity.

In some embodiments, the housing further defines a second cavity, wherein the optical detector is disposed in the second cavity.

In some embodiments, the second cavity is angularly offset relative to the first cavity when the first housing member is latched to the second housing member.

In some embodiments, the optical source has an emission spectrum spanning at least from an infrared band to an ultraviolet band.

In some embodiments, the optical source has an emission spectrum with a bandwidth in excess of 100 nm.

In some embodiments, the emission spectrum comprises at least wavelengths between 200 nm and 1000 nm.

In some embodiments, the first housing member and the second housing member form a rectangular opening when latched to one another.

In some embodiments, the first housing member and the second housing member form a circular opening when latched to one another.

In some embodiments, the latching mechanism comprises: a socket attached to the first housing member; and a clamp attached to the second housing member, the clamp being arranged to engage with the socket.

Some embodiments relate to a method for monitoring a fluid flowing through a pipe having a sight glass using an optical monitoring apparatus comprising a first housing member, a second housing member, and a spectral optical sensor having an optical source and an optical detector, the method comprising: placing the first housing member on a first side of the pipe and the second housing member on a second side of the pipe; latching the first housing member to the second housing member so that the first and second housing members engage with the pipe and the spectral optical sensor is aligned with the sight glass; illuminating a portion of the fluid by controlling the optical source to emit light through the sight glass; and producing an output signal by receiving the light upon being scattered from the fluid using the optical detector.

In some embodiments, the method further comprises determining a characteristic of the fluid using the output signal.

In some embodiments, controlling the optical source to emit light through the sight glass comprises controlling the optical source to emit an emission spectrum spanning at least from an infrared band to an ultraviolet band In some embodiments, latching the first housing member to the second housing member comprises engaging a socket attached to the first housing member with a clamp attached to the second housing member.

In some embodiments, latching the first housing member to the second housing member comprises bolting a portion of the first housing member to a portion of the second housing member.

Some embodiments relate to an optical monitoring system for monitoring a fluid, comprising: a first spectral optical sensor attachable to a first fluid carrier;

a second spectral optical sensor attachable to a second fluid carrier; and a controller configured to: receive an output of the first spectral optical sensor, the output of the first spectral optical sensor exhibiting a first spectral response; receive an output of the second spectral optical sensor, the output of the second spectral optical sensor exhibiting a second spectral response; and determine a change in characteristic between the fluid as passing through the first fluid carrier and the fluid as passing through the second fluid carrier by comparing the first spectral response with the second spectral response.

In some embodiments, the optical monitoring system further comprising determining whether to output a signal intended to vary a fluid composition changing procedure based on the change in characteristic.

In some embodiments, the optical monitoring system further comprising determining whether the fluid contains a target substance based on the change in characteristic.

In some embodiments, determining whether the fluid contains the target substance comprises: producing a value representative of a degree of similarity of the first spectral response with the second spectral response; and determining whether the value is above a threshold.

In some embodiments, the controller is further configured, if it is determined that the fluid does not contain the target substance, to produce a signal intended to inform a user that the fluid does not contain the target substance.

In some embodiments, the controller is coupled to a clean-in-place (CIP) system configured to clean the fluid, wherein the controller is further configured, if it is determined that the fluid does not contain the target substance, to control the CIP system to stop or move to a next stage of a cleaning routine.

In some embodiments, the first and second spectral optical sensors are configured to emit wavelengths with a bandwidth exceeding 100 nm.

In some embodiments, determining the change in characteristic between the fluid as passing through the first fluid carrier and the fluid as passing through the second fluid carrier by comparing the first spectral response with the second spectral response comprises using a machine learning model.

In some embodiments, the first spectral response and the second spectral response are defined in the same time interval.

In some embodiments, comparing the first spectral response with the second spectral response comprises: comparing a result of processing the first spectral response with a result of processing the second spectral response.

In some embodiments, comparing the first spectral response with the second spectral response comprises: directly comparing the first spectral response with the second spectral response.

Some embodiments relate to a method for monitoring a fluid using a first spectral optical sensor attachable to an input fluid carrier and a second spectral optical sensor attachable to an output fluid carrier, the method comprising receiving an output of the first spectral optical sensor, the output of the first spectral optical sensor exhibiting a first spectral response; receiving an output of the second spectral optical sensor, the output of the second spectral optical sensor exhibiting a second spectral response; and determining a change in characteristic between the fluid as passing through the first fluid carrier and the fluid as passing through the second fluid carrier by comparing the first spectral response with the second spectral response.

In some embodiments, the method further comprises determining whether to output a signal intended to vary a fluid composition changing procedure based on the change in characteristic.

In some embodiments, the first and second spectral optical sensors are configured to emit wavelengths with a bandwidth in excess of 100 nm.

In some embodiments, the method further comprises determining whether the fluid contains a target substance based on the change in characteristic.

Some embodiments relate to an optical monitoring apparatus for determining a first characteristic of a fluid, comprising: a broadband optical source configured to emit light having an emission spectrum spanning at least from an infrared band to an ultraviolet band; an optical detector configured to produce a output signal by receiving the light upon being scattered by the fluid; and a controller configured to: apply an operator to the output signal; and determine the first characteristic of the fluid by applying a machine learning model to a result of the operator as applied to the output signal.

In some embodiments, applying an operator to the output signal comprises integrating the output signal across at least a portion of the emission spectrum.

In some embodiments, applying an operator to the output signal comprises: determining a second characteristic of the fluid by applying the machine learning model to the result of the operator as applied to the output signal; and correlating the first characteristic with the second characteristic.

In some embodiments, the machine learning model is trained using spectra obtained by illuminating fluids having different characteristics

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

FIGS. 1B-1C are plots illustrating the spectra of two representative emitted optical signals, in accordance with some embodiments of the technology described herein.

DETAILED DESCRIPTION OF THE INVENTION

I. Overview

Figure 1A:
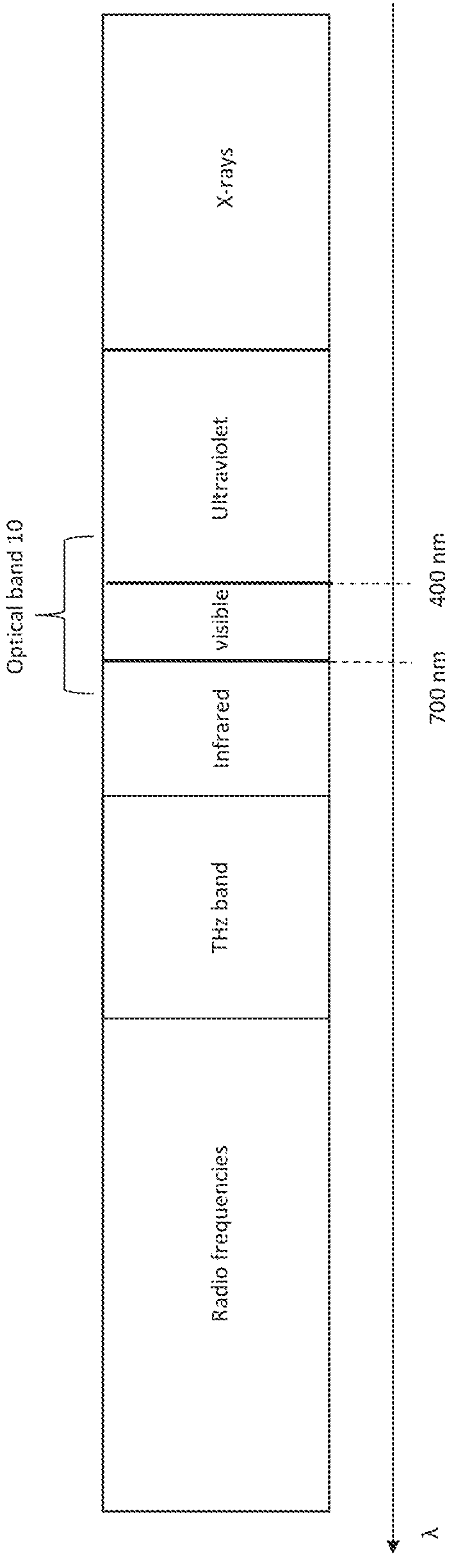
FIG. 1A is a diagram illustrating an optical band of the electromagnetic spectrum that may be used for sensing, in accordance with some embodiments of the technology described herein.

The inventors have recognized and appreciated techniques for monitoring materials (e.g., fluids) using optical sensing. The methods and systems developed by the inventors and described herein can be used in a variety of industries making use of fluids as part of their processes. Examples of fluids include but are not limited to water, oils, liquid chemicals, dyes, inks, materials in a liquid phase, solutions, mixtures, or other fluid-like materials including multi-phase materials and mixtures such as liquid-solid, liquid-gas, solid-gas, or liquid-solid-gas, as well as powders. In this case, multi-phase materials can also include a liquid-solid surface, such as but not limited to a metal surface, pipe, or glass window that a liquid touches or flows past. Example of industries that can benefit from the methods and systems described herein include but are not limited to chemical, food processing, beverage processing, oil refining, pharmaceutical, textiles, automotive, paints, coatings, data centers, microelectronics manufacturing, agriculture, livestock, power, steel milling, paper making, hospitality, dairy, wastewater treatment, just to name a few. The systems and methods described herein can also be used in municipalities, buildings, homes, cities, natural or manmade water bodies, and water treatment to monitor for water quality.

The inventors have recognized and appreciated that current methods for monitoring material samples are cumbersome and costly. Some such methods rely on grab samples-small representative subsets of a larger quantity, concentration or measurement taken at a specific time. A grab sample is typically visually inspected and sent to an offsite laboratory for chemical and microbiological analysis. This means that the results of these analyses are reactive or historical in nature in that the data is a snapshot of a past condition or composition. In the case of water treatment, effectiveness depends heavily on the concentration and type of contaminants within the water. Thus, in many treatment systems in industrial, manufacturing, and processing plants, the knowledge of water quality parameters such as pH, dissolved oxygen, Chemical Oxygen Demand, Biological Oxygen Demand, contaminant concentration, loadings, and more are crucial for optimizing treatment of the water. Yet, grab samples do not provide the ability to understand water composition in real time at a low cost. Further, there generally is a lack of understanding of the strength of wastewater incoming to be treated, which leads to high operating and resource cost, as well as inefficient operations.

In one use case, for certain chemical companies, understanding the color of their product is a key factor in determining the quality and grade of their product. For example, the coloring of the product is an important characteristic during distillation processes, as different chemical products with different colors are separated and distilled out. Since piping systems in these production plants are mostly made out of stainless steel, there is no effective way of understanding the color of their products within their piping systems. Oftentimes, grab samples are taken from an opening in the piping system for visual inspection after a certain period of time. However, this does not provide a real time reading and is labor intensive.

In another use case, a food processing company may have trouble understanding how long to run their clean-in-place (CIP) systems and cleaning processes. CIP is a method for automatically cleaning the interior surfaces of pipes, vessels, equipment, filters and associated fittings, without major disassembly. CIP uses turbulent flow through piping. Currently, some food processing companies run their processes using a timer—the automated cleaning process is run for a predefined period of time. However, there is little understanding of whether their tanks and piping systems are in fact clean at the end of the respective cleaning process. The solution is to run the cleaning process for as long as possible to reduce the chances that residual contaminants are still present. However, this solution is far from being efficient.

In yet another use case, for current water treatment processes, there is often little change in treatment techniques due to little knowledge about incoming water composition and strength of waste and wastewater. This can lead to overtreating or undertreating.

The inventors have recognized and appreciated that current problems preventing in-situ monitoring of fluids include the cost of current sensors as well as the fouling and constant maintenance required to operate these sensors. Some traditional optical sensors have a severely restricted breadth of measurement, limiting their practicality for determining fluid composition. Some of these sensors are specifically designed to meet the requirements of a particular application and may not be adapted to use in other contexts. Therefore, different applications demand ad hoc sensors, thereby increasing the costs of deploying these types of sensors. Sensors used to understand the composition of liquids and contaminants in water like chemical oxygen demand (COD) and total organic carbon (TOC) sensors have traditionally been quite expensive (e.g. in excess of $20,000), making them inaccessible for large scale deployment. Further, oil, grease, caustic buildup, biological matter, and contaminants tend to cover the sensor, causing sensor error in the data recorded and requiring constant cleaning and replacement of parts. This reduces the practicality of in-situ continuous sensors.

The techniques developed by the inventors and described herein overcome the problems discussed above. Some embodiments relate to inexpensive, easy-to-deploy and self-cleaning optical sensor assemblies to be used in the analysis of materials (e.g., fluid and fluid-like materials). Some such embodiments are designed to analyze, among other material characteristics, classification, composition, concentration of a particular substance, color, turbidity and other several properties, including for example changes in color and in concentration.

Some embodiments relate to broadband spectral optical sensors. The broadband nature of these sensors allows them to be deployed in several different settings regardless of the target characteristic to be monitored. This improves the reusability of these sensors over some conventional types of sensors, thereby decreasing costs. Broadband sensors of the types described herein are designed to span wavelengths ranging from the infrared band to the ultraviolet band. For example, some such sensors span wavelengths from 200 nm to 1050 nm. Other sensors span wavelengths from 200 nm to 1550 nm. Other sensors span wavelengths from 200 nm to 300 nm. Other sensors span wavelengths from 260 nm to 430 nm. Other sensors span wavelengths from 260 nm to 380 nm. Other sensors span wavelengths from 260 nm to 1000 nm. Other sensors span wavelengths from 220 nm to 1100 nm. Other sensors span wavelengths from 800 nm to 1025 nm. Other sensors span wavelengths from 200 nm to 2050 nm. Other sensors span wavelengths from 380 nm to 780 nm. Other sensors span wavelengths from 400 nm to 1000 nm. Other sensors span wavelengths from 380 nm to 1000 nm. Other sensors span wavelengths from 220 nm to 2500 nm. Other sensors span wavelengths from 1000 nm to 2000 nm. Other sensors span wavelengths from 200 nm to 5000 nm. Other broadband sensors of the types described herein are designed to span infrared wavelength. For example, some sensors span wavelengths from 4000 nm to 5000 nm. Other sensors span wavelengths from 2000 nm to 3000 nm. Other sensors span wavelengths from 3000 nm to 4000 nm. Other sensors span wavelengths from 5000 nm to 6000 nm. Other sensors span wavelengths from 200 nm to 6000 nm. Other sensors span wavelengths from 260 nm to 6000 nm. These sensors may be programmed to focus their analysis on a particular sub-band of the entire spectrum, depending on the particular application at hand. Additionally, these sensors may be reprogrammed over time. For example, a sensor may initially be configured to determine the concentration of a particular substance in water or pipe surface (e.g., iron oxide), and subsequently may be reconfigured to determine whether the pipe carrying the water is corroded. Thus, the sensor may initially analyze the frequency sub-band at which that particular substance is expected to give rise to spectral peaks and subsequently may analyze the frequency sub-band at which corrosion is expected to give rise to spectral peaks. In some embodiments, when analyzing a particular sub-band, a sensor may disregard frequencies outside that sub-band. Machine learning models may be used to determine the expected frequency sub-band in a particular context. Such machine learning models may be trained with data indicating the scattering, absorbance, reflectance, and fluorescence wavelength of a particular substance and descriptive information about the substance.

In other embodiments, the entire spectrum of emission may be used to determine a characteristic of a fluid. In one example, taking the integral of the spectrum associated with a fluid may provide an indication as to the nature and the characteristics of that fluid. In another example, a characteristic of a fluid may be correlated with another characteristic of the fluid, where the second characteristic has a stronger signature than the first characteristic. In these circumstances, instead of analyzing directly the first characteristic, the second characteristic may be analyzed and the first characteristics may be inferred from the second characteristic. An example is in the measurement of sugar concentration in wash water used to wash a carbon filter in a corn milling facility. Sugars like glucose and sucrose have absorbances in the UV range of 200-300 nm range and monitoring those wavelengths are a possibility for understanding sugar concentration in the wash water. However, it was identified that the concentration of carbon fines in the wash water also had a high correlation with the sugar concentration in the wash water. The carbon fines have high absorbance in the visible range of 400-700 nm and can be used to approximate sugar concentration in the wash water of this particular use case. Another example is the use of absorbance of soybean oil to measure COD concentration in wastewater from a facility that produces soybean oil. This is because the material contributing to COD in the wastewater of the soybean refining facility is soybean oil.

Further embodiments relate to methods for identifying composition, concentration, and various other material properties (and variations of these characteristics over time) by taking spectral readings and normalizing, analyzing, processing and combining the data through an algorithm. These algorithms can include but are not limited to integration, summation, subtraction, normalization, principal component analysis, decision trees, random forest, neural networks, convolutional neural networks, unsupervised learning, clustering, KNN, signal processing and regression. For example, these algorithms may identify wavelength sub-bands for various measurement parameters. These algorithms can normalize the environmental differences in different deployment environments and return insights that are not limited to, but include, the properties listed above. Optionally, the data can be integrated within industrial control systems such as PLCs, DCSs, SCADAs, HMIs for automation and controls.

Additional embodiments relate to techniques for coupling a spectral sensor with a database to store and draw recorded data to display insights. Alerts systems may be set up to notify when certain values are recorded, and thresholds are passed. These thresholds can be set by a user or an algorithm.

Additional embodiments relate to techniques for training and applying a model on the collected spectral and material property data along with additional data provided to learn processes such as but not limited to water treatment, distillation, supply chain cleaning of tankers, trucks, rail cars, or trains, production processes, product and material QA/QC and production optimization, heating and cooling, optimization of operating equipment and engines, failure prediction, anomaly prediction, process optimization prediction, and equipment cleaning to optimize these processes. These optimizations can be suggestions for personnel to implement or be implemented autonomously.

The inventors have developed further techniques intended to overcome the challenges of cleaning and maintenance of sensors in fluid environments and water. The problem to be solved is to allow sensors to measure fluid environments at higher accuracy and lower maintenance. Thus, some embodiments relate to a self-cleaning and fouling resistant apparatus using a combination of cleaning techniques such as but not limited to air jets, water jets, ultrasound-based tools, wipers, etc.

The inventors have further developed a variety of sensor enclosures and measurement chambers, which allow a sensor to be mounted to a process flow pipe inline, a tank, or liquid body, in a flowthrough mechanism. Flowthrough mechanisms are particularly desirable in that they enable inspection of a fluid without having to route the fluid to a dedicated chamber.

It should be noted that the techniques developed by the inventors and described herein can be applied not only in the context of liquids and more generally of fluids, but also to solids, including solids in contact with fluid mediums. An example of this is the measurement of properties like color change, fouling, corrosion, scaling, bio-fouling and bacterial growth, and materials stuck on a pipe or tank surface with fluid flow in it or containing a fluid. This is important because depending on the contaminants in a liquid, fouling will occur on the solid surfaces they contact. There is a need to understand how much fouling occurs on the surface to prevent issues like clogging, scaling, corrosion, and bio-fouling as well as keeping sensors in the environment clean and preventing equipment damage. Fouling can impact the accuracy and efficacy of a reading. Understanding what substance is stuck on surfaces like that of pipes and tanks can also help in monitoring and optimizing cleaning processes like those described above.

Another example of measuring solid in contact with fluids is a fluid solid mix. Some examples of cases of a fluid that comprises solids, that this disclosure could solve, is the problem of measuring dust type and concentration in the air and suspended solids in water or other fluids.

Thus, some embodiments relate to the use of a sensor that can take spectral readings and return results in real time to determine material properties like color, turbidity, composition, concentration, material classification, etc. The sensor can be mounted in line, or parallel, to a pipe, as well as in a tanker, truck, reactor, or equipment, or be dropped in a pit or tank and take continuous readings of fluid material in it. The system can upload the data captured by the sensor to a database that is either online, or local, and have the data be processed in or near real time. In prior art systems, grab samples would need to be taken and sampled, then tested in a spectrometer which was often off site. The techniques developed by the inventors allow the samples to be monitored in-situ and continuously.

Uses of the spectral sensor include but are not limited to the determination of change in color and composition of liquids and chemicals, changes in concentration of fats, oils, and greases, changes in concentration of egg whites in water, changes in concentration of starches, presence of certain proteins, changes in concentration of sugars, changes in material or product quality for continuous real-time QA/QC, changes in levels of fat, variation in different products, soiling in wash water and cleaning solution/chemicals, changes in color of dyes and ink, changes in composition of chemicals, changes in total solids, changes in oxidation, changes in chemical properties of materials, changes in pi conjugation among others.

II. Optical Broadband Monitoring Techniques

Some embodiments relate to broadband spectral optical sensors. FIG. 1A is a diagram illustrating the bands of the electromagnetic spectrum as a function of the wavelength, in accordance with some embodiments. Some embodiments involve optical sensors configured to perform spectroscopy within an optical band 10 that spans from the infrared (IR) band to the ultraviolet (UV) passing through the visible band. As used herein, the visible band refers to wavelengths between 4000 nm and 700 nm. The inventors have recognized and appreciated that performing spectroscopy in a broadband fashion allows the same sensor or a controller taking in sensor data to be reprogrammed to be utilized in a variety of contexts. Depending on the particular application at hand, a sensor may be programmed to analyze only a particular sub-band of interest, and to disregard the wavelengths outside that sub-band.

Figure 1B:
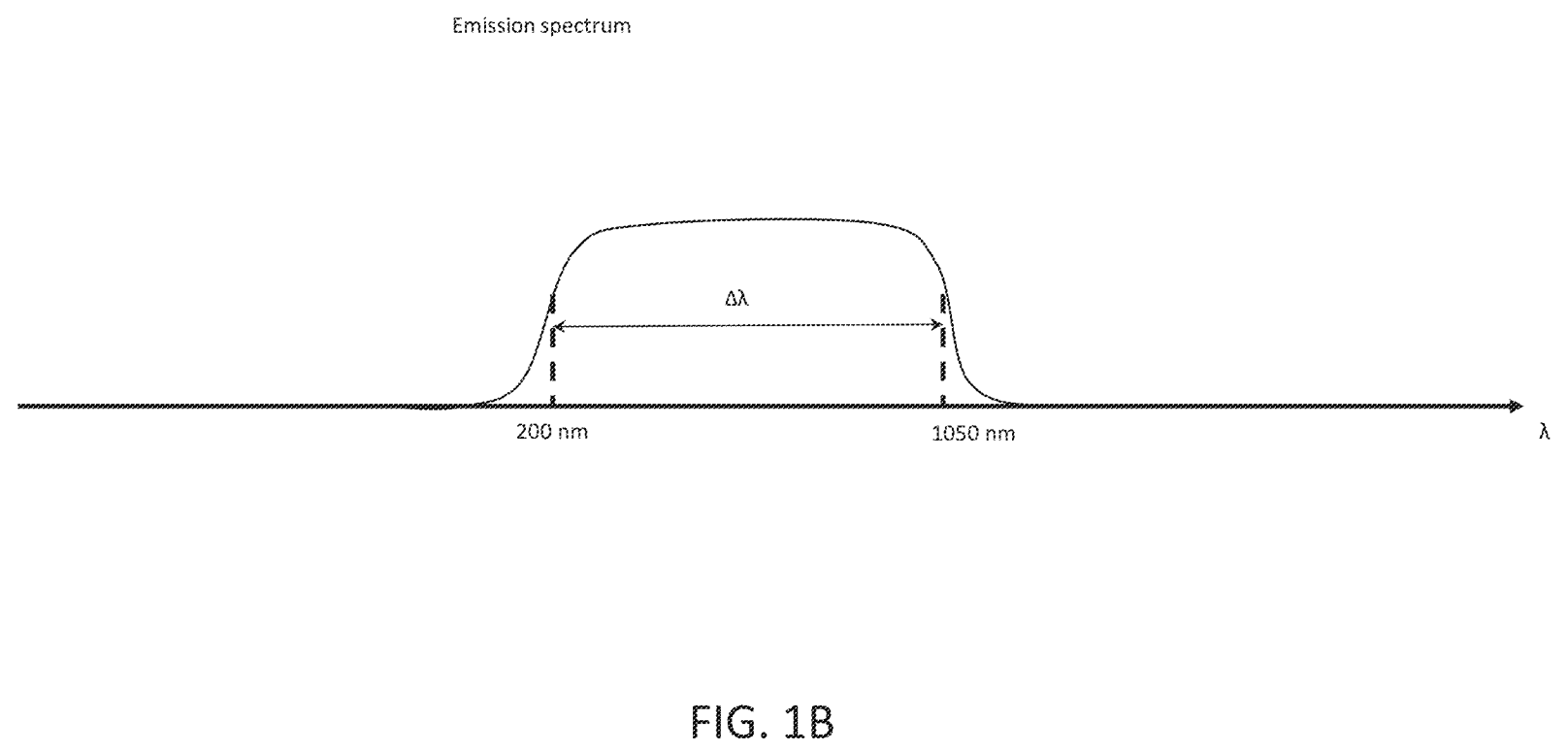

FIG. 1B is a plot illustrating an example of an emission spectrum, in accordance with some embodiments. In this example, an optical source is configured to emit light having a bandwidth spanning from 200 nm to 1050 nm (here, 200 nm and 1050 nm are defined as the wavelengths at which the magnitude of the spectrum drops by 3 dB relative to the peak value). Other implementations may emit light defined in different bands. The bandwidth $\Delta\lambda$ of the emission spectrum may be in excess of 100 nm, in excess of 200 nm, in excess of 300 nm, in excess of 500 nm, in excess of 1000 nm, in excess of 2000 nm. For example, the bandwidth $\Delta\lambda$ of the emission spectrum may be between 100 nm and 2000 nm, between 100 nm and 1500 nm, between 100 nm and 1000 nm, between 200 nm and 300 nm, 260 nm and 380 nm, 260 nm and 430 nm, 380 nm and 1000 nm, 200 nm and 1000 nm, 380 nm and 780 nm, 400 nm and 1000 nm, 500 nm and 1000 nm, 500 nm and 2000 nm, 750 nm and 1000 nm, 750 nm to 1700 nm, 800 nm and 1025 nm, 200 nm and 5000 nm, 1000 nm and 2000 nm, 2000 nm and 3000 nm, 3000 nm and 4000 nm, 4000 nm and 5000 nm, 2000 nm and 5000 nm, 5000 nm and 6000 nm, 200 nm and 6000 nm, 260 nm and 6000 nm, or between 750 nm and 2000 nm, among other possible ranges. It should be noted that, in some embodiments, external or environmental light may be used instead of, or in addition to, an optical source to produce broadband light.

Figure 1C:
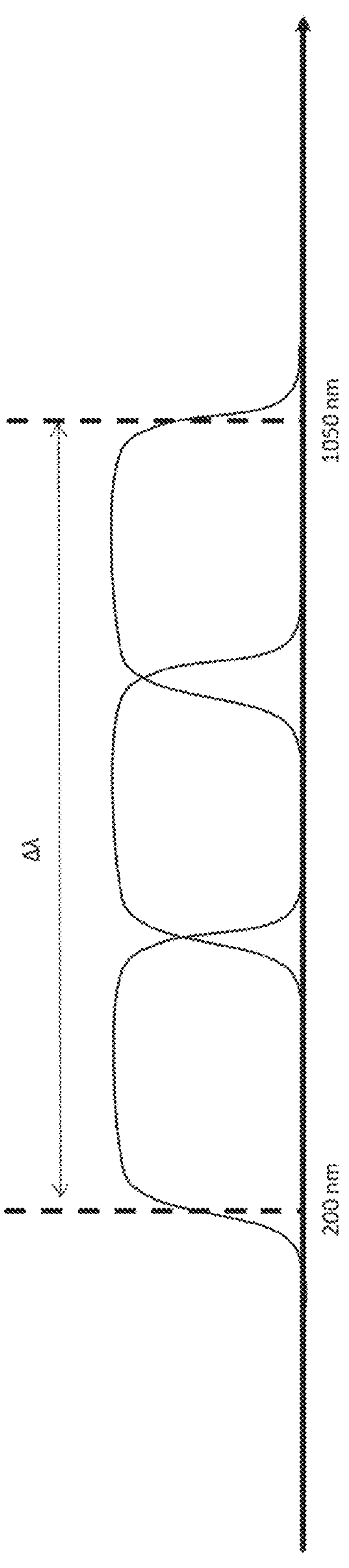

In other embodiments, an optical source may produce a broadband signal by combining various emitters emitting at different frequency ranges. The example of FIG. 1C includes three emitters. The emitters have emission spectra that partially overlap with one another. In this example, the bandwidth $\Delta\lambda$ of the emission spectrum encompasses the spectra of all the emitters.

Figure 1D:
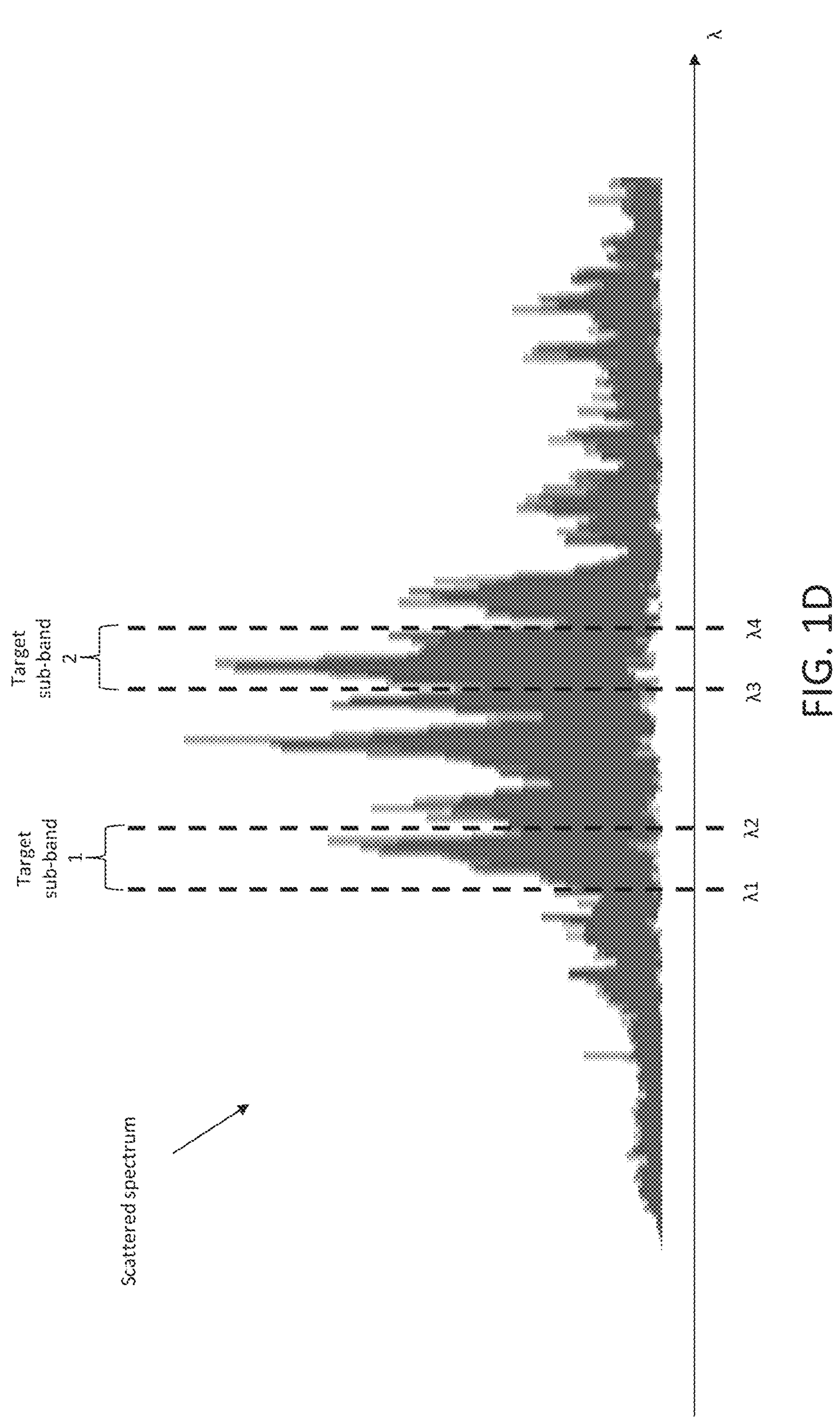
FIG. 1D is a plot illustrating the spectrum of a representative scattered optical signal, in accordance with some embodiments of the technology described herein.

FIG. 1D is a plot illustrating the spectrum of light scattered from a material (e.g., from a fluid) upon being illuminated with the light discussed in connection with FIG. 1B. It should be noted that the expression "scattered light" indicates light reflected from a material, light transmitted through a material, or fluorescence light produced by a material, regardless of the emerging angle. Thus, the term "scattering" encompasses reflection, transmission and fluorescence. From transmission, the light absorbed can also be determined. The scattered light of the example of FIG. 1D presents a few peaks. In some embodiments, the optical sensor may determine a characteristic (e.g., color, turbidity, composition, concentrations, etc.) of the scattering material based on a spectral analysis of the scattered light.

In some embodiments, an optical sensor may be programmed to search for a particular characteristic of a material. As such, an optical sensor may be programmed to analyze a particular spectral sub-band, and to disregard the spectrum outside the sub-band from the analysis. It should be noted that more than one sub-band may be taken into consideration, and these sub-bands need not be adjacent. In the example of FIG. 1D, the optical sensor analyzes the spectral content between λ1 and λ2, and between λ3 and λ4, and disregards the remainder of the spectrum.

The target sub-band may be selected in any of numerous ways. In some embodiments, the target sub-band may be selected on the basis of information associated with the material being analyzed. For example, a sub-band may be selected on the basis of the expected scattering wavelength(s) of a substance the presence and concentration of which is being determined. Machine learning models may be used in some embodiments to determine which sub-band(s) to associate to which type of analysis. Such machine learning models may be trained with data indicating the scattering wavelength of a particular substance and descriptive information about the substance. For example, since sugars have a peak at wavelengths in the UV spectrum, the subbands at the UV wavelengths (200-300 nm) can be isolated to identify for sugars. Meanwhile, fats have a peak at wavelengths in the IR spectrum, so the subbands at the IR wavelengths (1000-2000 nm) can be isolated to identify and determine concentration of sugars. Furthermore, specific colors have specific wavelengths in the visible light spectrum, which subbands can then be isolated to identify for color generally or for a specific type of color.

Accordingly, some embodiments relate to a method for determining a characteristic of a fluid. The method involves 1) illuminating a portion of a fluid by emitting, using a broadband optical source, light having an emission spectrum spanning at least from an infrared band to an ultraviolet band; 2) producing an output signal by receiving the light upon being scattered by the fluid using an optical detector; 3) selecting a target sub-band of the emission spectrum based on information associated with the fluid; and 4) determining the characteristic of the fluid using a portion of the output signal associated with the target sub-band of the emission spectrum.

In some embodiments, a characteristic of a fluid may be determined on the basis of the entire scattering spectrum. For example, a fluid may be illuminated with light having a spectrum spanning from 200 nm to 2000 nm. In some such embodiments, a characteristic of a fluid may be determined on the basis of the spectrum of the light scattered from the fluid between 200 nm and 2000 nm. Integrating and summing the sensor readings of the different wavelengths within the measured spectral band can also be used to determine change in concentration and color darkness. A neural network and other algorithms can also be used and trained by spectral data and data from other sources to determine sample properties.

Figure 1F:
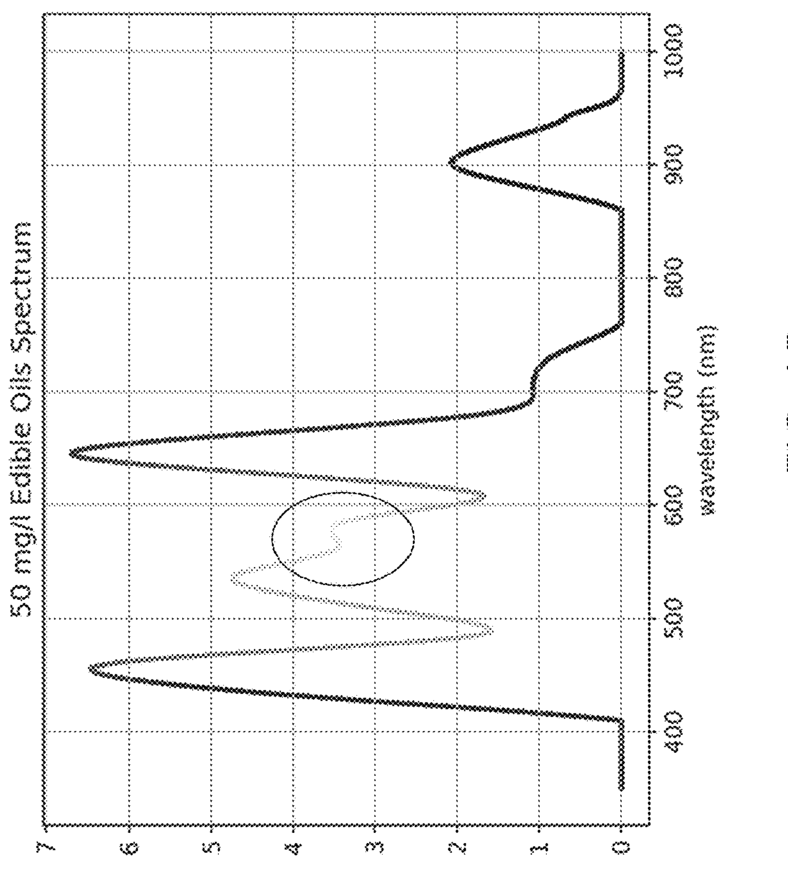
FIG. 1F is a plot illustrating the spectrum of water including 50 mg/liter of edible oil in water, in accordance with some embodiments of the technology described herein.
Figure 1E:
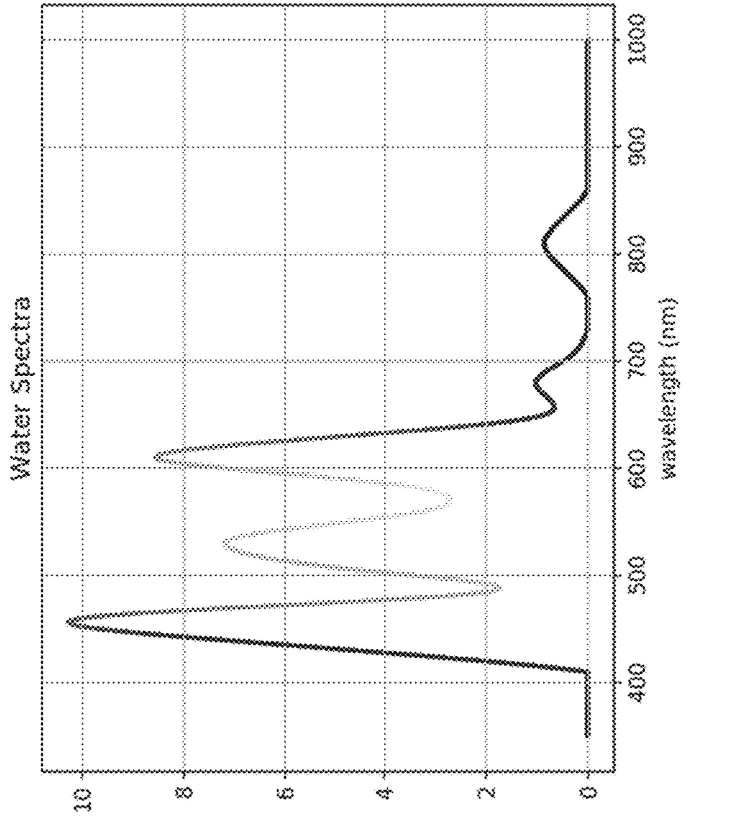
FIG. 1E is a plot illustrating the spectrum of water, in accordance with some embodiments of the technology described herein.

FIGS. 1E-1F provide an example intended to illustrate how the methods described herein can be used to determine a characteristic of a fluid. FIG. 1E is a plot illustrating the spectrum of water and FIG. 1F is a plot illustrating the spectrum of water including 50 mg/liter of edible oil. As can be appreciated from these figures, the spectrum of FIG. 1F exhibits an amplitude peak at around 580 nm (corresponding to yellow light). In some embodiments, it may be determined that the sampled water includes an edible oil by selecting for example the 560-600 nm sub-band, and by determining whether the selected sub-band exhibits a variation with respect to the spectrum of water.

In other embodiments, the entire spectrum of emission may be used to determine a characteristic of a fluid. In one example, taking the integral of the spectrum associated with a fluid may provide an indication as to the nature and the characteristics of that fluid. In another example, the spectrum associated with a first fluid may be correlated with the spectrum associated with a second fluid having similar characteristics, where the second spectrum has a stronger signature than the first spectrum. In these circumstances, instead of analyzing directly the first spectrum, the second spectrum may be analyzed and the characteristics of the first fluid may be inferred from the second spectrum.

In some embodiments, a controller applies an operator to the signal produced by a sensor in response to receiving light from a fluid. For example, the controller may compute the integral of a spectrum. The controller may then determine a characteristic of the fluid by applying a machine learning model to a result of the operator as applied to the signal. The machine learning model may be trained using spectra obtained by illuminating fluids having different characteristics.

III. Analysis of Fluids

Optical sensors of the types described herein may be attached to pipes (including hoses, tanks, tubes, and other mediums through which a fluid may flow) to monitor a characteristic of a fluid. Optical sensors may be positioned in parallel or in line. In parallel configurations, part of a fluid may be routed to a dedicated chamber, where the fluid is then analyzed. In in-line configurations, the optical sensor may analyze the fluid as it passes through a pipe. In line configurations are generally more desirable in that a change in the configuration of the piping system is not required.

Figure 2A:
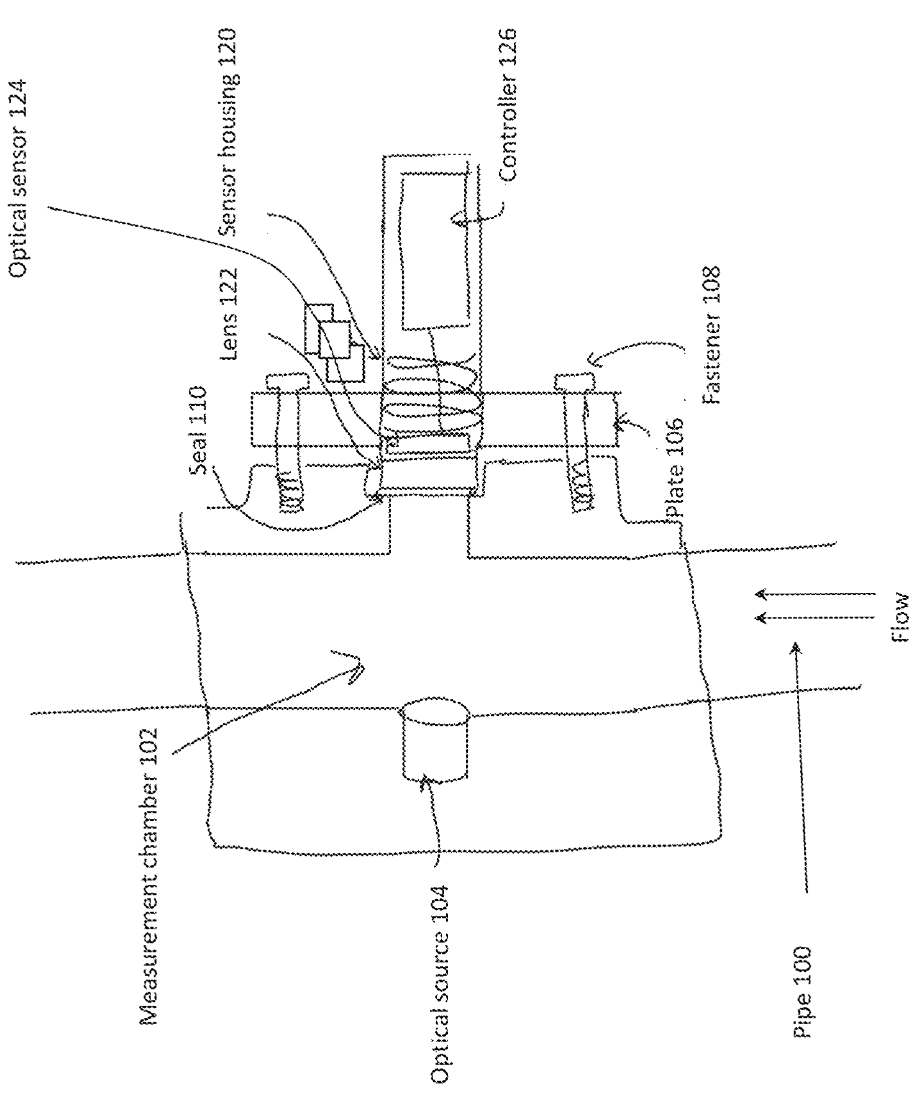
FIGS. 2A-2C are schematic diagrams of representative optical monitoring apparatuses, in accordance with some embodiments of the technology described herein.

FIG. 2A is a schematic diagram of a representative optical monitoring apparatus, in accordance with some embodiments of the technology described herein. The apparatus includes a measurement chamber 102 that is in line with pipe 100. In this example, a fluid flows from the bottom of the page in the upward direction. Plate 106 is attached to chamber 102 via fasteners 108. The plate supports sensor housing 120, which in turn hosts lens 122, optical sensor 124 and controller 126. A seal 110 (e.g., an o-ring or a sealant) hermetically seals the sensor from the chamber. An optical source 104 emits light (e.g., broadband light, as discussed in connection with FIG. 1B). The light propagates through the fluid and hits optical sensor 124. In this example, the apparatus works in transmission mode, meaning that the optical sensor detects light transmitted through the fluid. In the other embodiments, an apparatus may work in reflection mode, such that the optical sensor detects light reflected from the fluid.

The measurement chamber can be of a black or dark color to reduce the reflection of light from the surface that may interfere with the data collected by the spectral sensor. Alternatively, other colors may be used and coated with a black or dark color or non-reflective material. The measurement chamber's size and shape can be selected to adjust for flow rate, spectral absorbance properties of the material to be monitored for, the concentration of that material, and more.

Housing 120 includes an optical window for accommodating lens 122. Lens 122 may be made out of borosilicate, acrylic, sapphire, quartz, or other type of transparent material. Inside the optical window is the spectral sensor. Parts of the spectral sensor not responsible for the flashing of light or capture of light/optical data can be covered with black paint or other coverings. This reduces light reflecting from the spectral sensor board itself, interfering with the sensor readings. Lens 122 focuses the scattered light on the plane of the optical sensor 124. Optical sensor 124 produces an output signal responsive to receiving the scattered light. Controller 126 obtains the output signal from optical sensor 124 and can log, analyze, display, transmit, and/or process the data in any suitable way. For example, controller 124 may determine a characteristic of the fluid based on the spectral content of the output signal. Controller 124 can be in the same housing as the sensor or a separate housing.

Plate 106 may be attached to wiring, electronics, and controller 126 that include but are not limited to circuitry for processing, logging, analyzing, transmitting, and displaying data. The optical sensor enclosure can be of a dark color to reduce reflection and light interference with the spectral sensor. Both the enclosure of the spectral sensor and measurement chamber can be threaded so that the spectral sensor can be directly screwed into the measurement chamber for easy insertion and removal.

Housing 120 and measurement chamber 102 may be made out of aluminum, nylon, Delrin (Polyoxymethylene), PVC, stainless steel, or other types of materials. These materials can include but are not limited to metals, ceramics, or polymers. Choice of materials used in the sensor housing and measurement chamber can be dependent on the type of environment that the device is deployed in, the type of sample to be analyzed, the budget, etc. Sealants and adhesives used include rubber, EPDM, PTFE, epoxy and silicon, however, other sealants and adhesives can also be used.

Fluid samples can flow through the measurement chamber by having it be attached to a flow system like a pipe, or they can be pumped through the measurement chamber using a pump. To limit fouling of the sensors, the sample can be pumped out or flowed out of the measurement chamber after a reading is taken and a clean liquid (ex. clean water, cleaning solution, storage solution, etc.) can be pumped or flowed in. Additionally, cleaning mechanisms like water jets, air jets, wipers, ultrasound, ultraviolet radiation, and others can be used to keep the sensor clean. In some embodiments, to offset drift from sensor fouling a second spectral sensor can also be implemented in the measurement chamber to monitor and compare for drift in any one sensor. The sensors can also be placed close to each other to spot for abnormalities and drifts in readings.

In the implementation of FIG. 2A, housing 120 is fastened directly onto the measurement chamber. As will be discussed in detail below, optical source 104 can be placed 0, 90, and/or 180 degrees (or any other suitable angle) from the sensor in order to take absorbance, reflectance, and/or fluorescence readings. Internal batteries or on an external power source can be used to power the sensor.

Figure 2B:
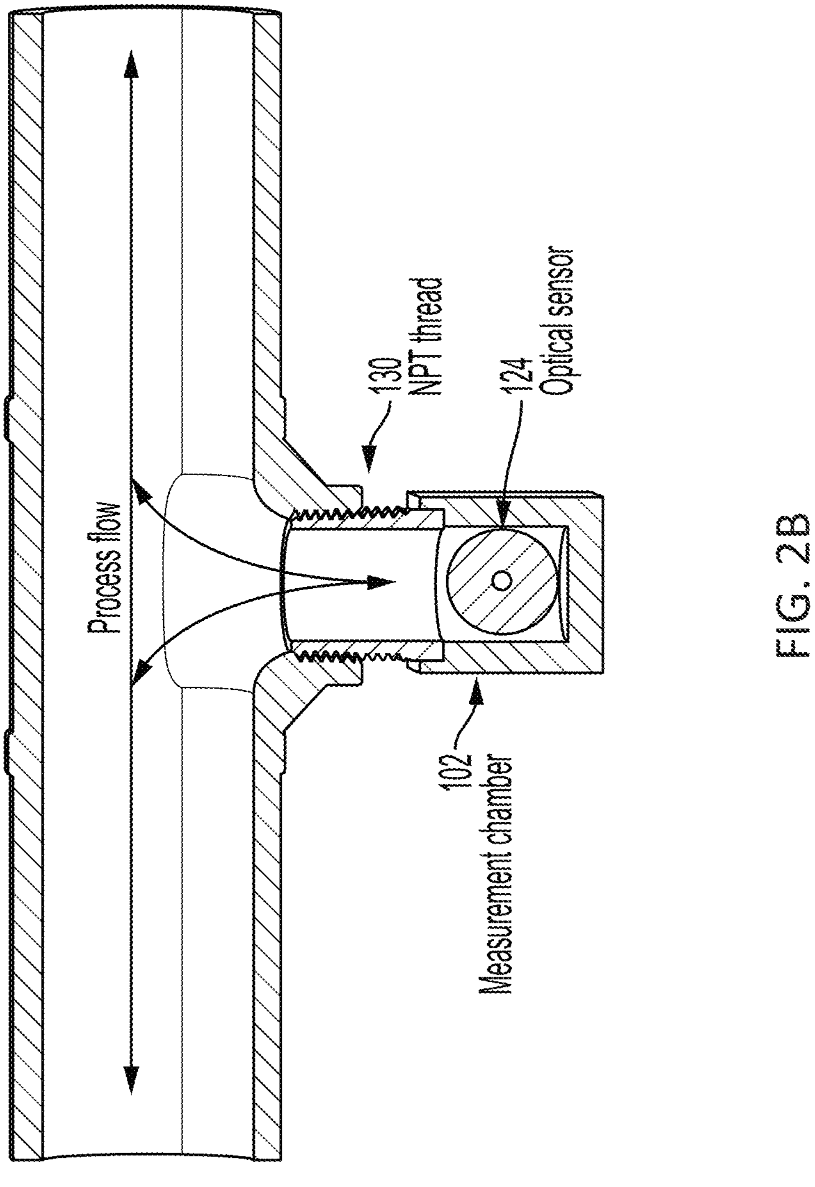

The implementation of FIG. 2B includes a single opening system screwed or attached to the system (ex. pipe or tank) containing material to be measured (e.g., water, oil, chemicals, egg white, food, beverage, beer, petroleum, dairy, oil, corrosion or fouling on the surface, etc.). The measurement chamber keeps the measurement environment controlled and consistent across different deployed environments. The measurement chamber size can be adjusted and changed depending on the concentration and opacity of the sample to be measured, the flow rate of the sample, and the environment deployed at. For a single opening system as the one shown in FIG. 2B, a door can be placed on one side of the measurement chamber that can be opened to allow for cleaning of the measurement chamber. If the measurement chamber is screwed into the pipe or tank, it can be screwed off for cleaning as well. In some embodiments, CIP systems may be used for automatic cleaning.

Figure 2C:
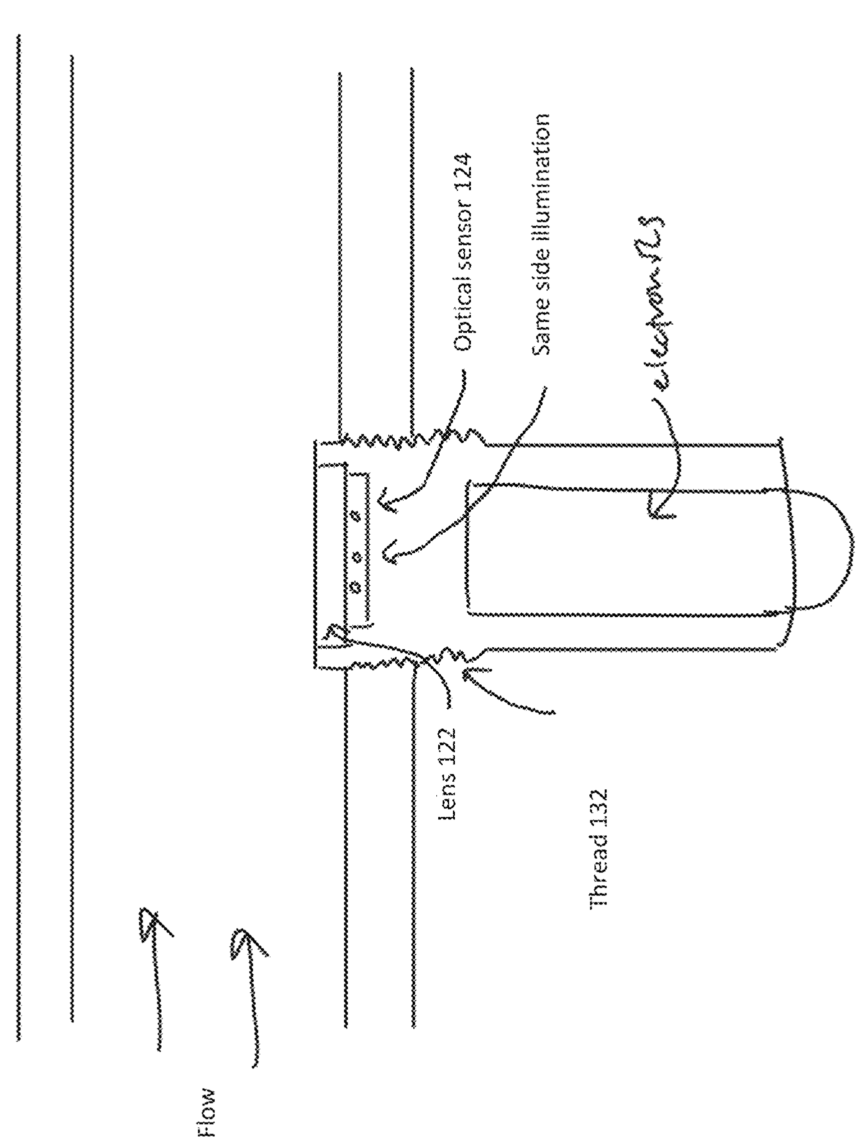

A version of the spectral sensor can also be deployed without a measurement chamber, as shown in the example of FIG. 2C. In this case, the same spectral sensor described above is attached or screwed into a system (e.g., pipe, tank or truck/tanker equipment) containing the material to be analyzed. The material to be analyzed can be flowing or not. The spectral sensor includes an encasing and contains a lens and a spectral sensor. Additional parts such as electronics for data processing, storage, analysis, and communications can also be inside the sensor housing or attached to it separately. The sensor can still allow for continuous real-time readings of the material to be monitored without having it be manually removed from its containment system.

Due to differences in piping materials and size, there may be differences in results in different deployment environments. For different deployment sites, there may be a different background spectrum. In order to keep readings consistent in different deployed environments (e.g., different pipes and tanks), a normalization method to remove the environmental background footprint where the sensor is deployed may be used. When the sensor is deployed in a new environment, spectral readings may first be taken in the measurement environment without any samples or with a control sample (e.g., clean water or a pure product) pre-set to be used as a baseline to normalize, calibrate, and use against for future samples. The sensor readings can be taken and transmitted to a database or stored internally where the data is used for process optimization. Sensor readings can also be used to trigger an alarm or notification system when it is past certain thresholds or changing at certain rates, informing the user of changes in liquid properties like color, concentration, or composition. For data taken by the spectral sensors, signal averaging can also be applied to reduce noise. The gain and exposure time of the sensor can also be changed, as well as brightness of the optical source to reflect the concentration and absorption properties of the sample measured. A version of the spectral sensor can also be deployed as a probe that is dropped in a tank, pit, or liquid containment source.

Algorithms may be applied on optical sensor data to determine characteristics such as but not limited to sample concentration, color, turbidity, composition, chemistry, etc. Principal component analysis is used to reduce the dimensionality of the spectral data to reduce noise as well as prevent models from overfitting onto the data used to train the models. Furthermore, decision trees and random forest algorithms can be used to determine sample composition and type. Spectral data from the sensors of samples of known concentrations and properties are used to train a regression model that is then used to determine the concentration, color, and other properties of test sample data. Integrating and summing the sensor readings of the different wavelengths within the measured spectral band can also be used to determine change in concentration and color darkness. A neural network and other algorithms can also be used and trained by spectral data and data from other sources to determine sample properties. Other models and variations of the models described above may also be used to achieve the same purpose of revealing sample properties from sensor data.

Since different material properties, liquid properties, chemistries, and qualities reflect and absorb different wavelengths of light and have unique spectral fingerprints, algorithms, computation, and machine learning can be applied to statistically process the spectral fingerprint and convert the collected fingerprint to real actionable parameters of interest. Since this spectral sensor is capturing a broadband reading across a range of wavelengths, algorithms can then be used to identify optimal analysis techniques whether utilizing the integration of the spectra, or specific wavelengths or ranges of wavelength optimally used to identify the parameter—or parameters—of interest through one captured spectral fingerprint. This algorithm can be utilized to continuously identify by processing the captured spectral fingerprint in real-time (or near real-time) both the classification of the material, classification of variations of the material (applicable in but not limited to product or material QA/QC use cases and more), as well as quantitative concentration measurements of the property of the material for its characteristics. With an algorithm, the computational analysis of the collected real-time spectral fingerprints of the spectral sensor enables diverse applications and use cases, various measurement parameters or set of measurement parameters, and various mediums of liquid-water, oil, dairy, chemicals, beverage, hydraulic fluid, pharmaceuticals, the product being manufactured, dyes, ink, powders, and more-without core hardware changes or methodology changes. With the algorithm, the deployed sensor or deployed network of spectral sensors can be strategically configured to drive value and action to be taken. For example, in a sanitation use case, the algorithm can process data collected by the spectral sensors, which can be deployed to measure soiling of the wash water or cleaning solution in real-time to enable performance-based optimization through quantitative real-time data. The algorithm can piece together and analyze collected spectral fingerprint data strategically from a set of deployed spectral sensors—rather than just one individual sensor it is correlated to—in order to drive actionable decisions.

IV. Multi-Sensor Systems

The inventors have developed techniques that can assist in the operational efficiency of industrial processes through the use and analysis of data collected from optical spectral sensors. An example of this is in clean-in-place (CIP). CIP systems wash and sanitize equipment to keep them clean for operations. CIP is generally one of the largest contributors of downtime. This is because production and operations need to shut down during the line cleaning process, which detracts time for production.

The inventors have recognized and appreciated that operators of CIP systems face severe difficulties to understand how long to run their cleaning processes. Most CIP cycles are based on a timer or volumetric system for determining how long to run each wash step, conductivity to determine caustic and sanitizer concentration, and temperature. However, there is little understanding of whether and how much of the material to be removed from the cleaning process has been actually removed by the wash solution. There is also little real-time performance-based understanding of whether the tanks and piping systems are cleaned to completion at the end of the respective cleaning process.

The techniques described by the inventors enable performance-based cleaning by placing an optical sensor at the supply pipe and one at the return pipe in a CIP system. Optionally, one or more additional sensors may be placed in the middle of the process line or equipment of interest. The data output from the sensors at the supply and return pipes, such as the spectral output of an optical or spectral sensor can be compared with one another. If the spectral data of the two sensors approach each other and match within a set margin of confidence, the sensors will return information that the wash solution is no longer removing material from the pipe, tanks, equipment that it is washing. Thus, this stage of the wash cycle is complete. This is especially valuable in the first rinse of a clean-in-place process where water is intended to remove most of the material from the equipment to be cleaned. A margin of error of additional wash time can also be added after the spectral data from the sensors match where the sensors determine whether the spectral data continue to match before a decision is made to end that step of the wash cycle. This is done to prevent situations where a clump or group of material stuck on the surface of the equipment being washed is missed because it was not removed at a specific moment of measurement.

In some embodiments, optical sensors that are deployed within a CIP system are connected with each other, or data is aggregated at a central source that analyzes the data of the deployed sensors. Data from different sensors placed within a CIP system can be communicated to each other through wired communication (e.g., Modbus, EtherNet/IP, i2c) or wirelessly (e.g., WiFi, LoRa, Bluetooth, cellular etc.). A controller may process data obtained from the optical sensors. The controller may be local or may be in the cloud.

Figure 3A:
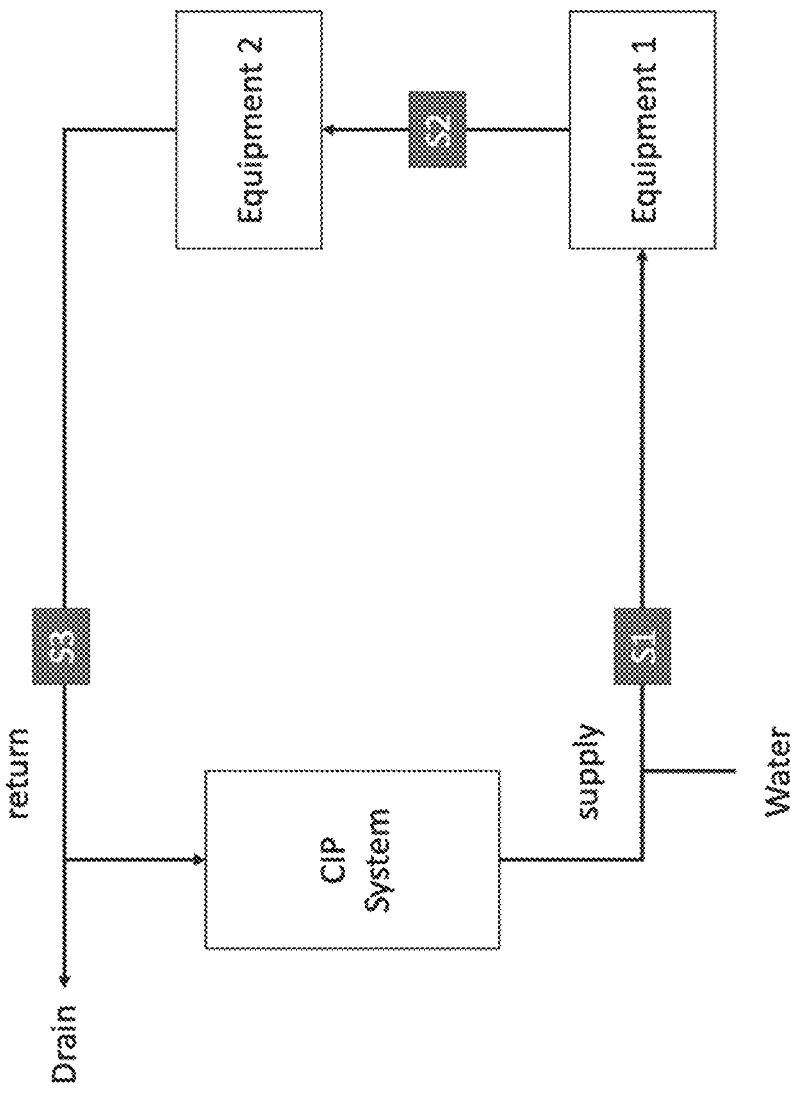
FIGS. 3A-3C are schematic diagrams of representative optical monitoring systems, in accordance with some embodiments of the technology described herein.

FIG. 3A is a schematic diagram of an apparatus including a CIP system configured to clean equipment 1 and equipment 2. This apparatus may be configured to perform a fluid composition changing procedure, e.g., a procedure for cleaning a fluid, a procedure for cleaning equipment using a fluid or a procedure for changing the composition of a fluid in a particular manner. In this example, three optical sensors of the types described above are deployed (though any other suitable number of sensors greater than 1 may be used). Optical sensors S1 and S3 are located at the supply fluid carrier and return fluid carrier fluid carrier of the CIP system, respectively. Sensor S2 is within the equipment and process line. Additional sensors can be placed throughout the CIP and equipment and process line. CIP system periodically cleans the water passing through the system. Fluid carriers of the types described herein include pipes, tanks, reservoirs or other media capable of enclosing or carrying fluids.

Optical sensor S1 takes measurements in connection with the water (or other fluids) provided through the supply fluid carrier. Optical sensor S3 takes measurements in connection with the water (or other fluid) passing through the return fluid carrier, downstream from equipment 1 and equipment 2. Optionally, optical sensor S2 takes measurements in connection with the water (or other fluid) passing through the fluid carrier disposed between equipment 1 and equipment 2. A controller (not shown in FIG. 3A) connected to the sensors compares the spectra obtained by the optical sensors. Based on the comparison, the controller determines a change in characteristic between the fluid as passing though the pipe of sensor S3 and the fluid as passing through the pipe of S1, for example. Based on this, the controller determines whether the return water is sufficiently clean. The output of sensor S1 can be viewed as a reference indicating the cleanliness of the cleaning water. In one example, the controller may determine whether a value representative of the comparison is above or below a threshold. If it is determined that the return water is sufficiently clean, the controller may output a signal intended to inform a user that the water is clean and/or may stop the operation of the CIP system. A machine learning model or other algorithms may be used to determine how the comparison of the spectra correlate to the cleanliness of the return water.

The inventors have recognized and appreciated that use of spectral data from multiple locations or stages of a process enables a deeper understanding of nature of the samples. Thus, the techniques described herein may be used to determine the mixture of samples and where and when within a process the mixing occurs. Absorbance, scattering, reflection, fluorescence, and phosphorescence of each component in the sample sums together. For the example of absorbance, the sum of absorbances of each component at their specific wavelengths equals the absorbance of a mixture of these components.

Figure 3B:
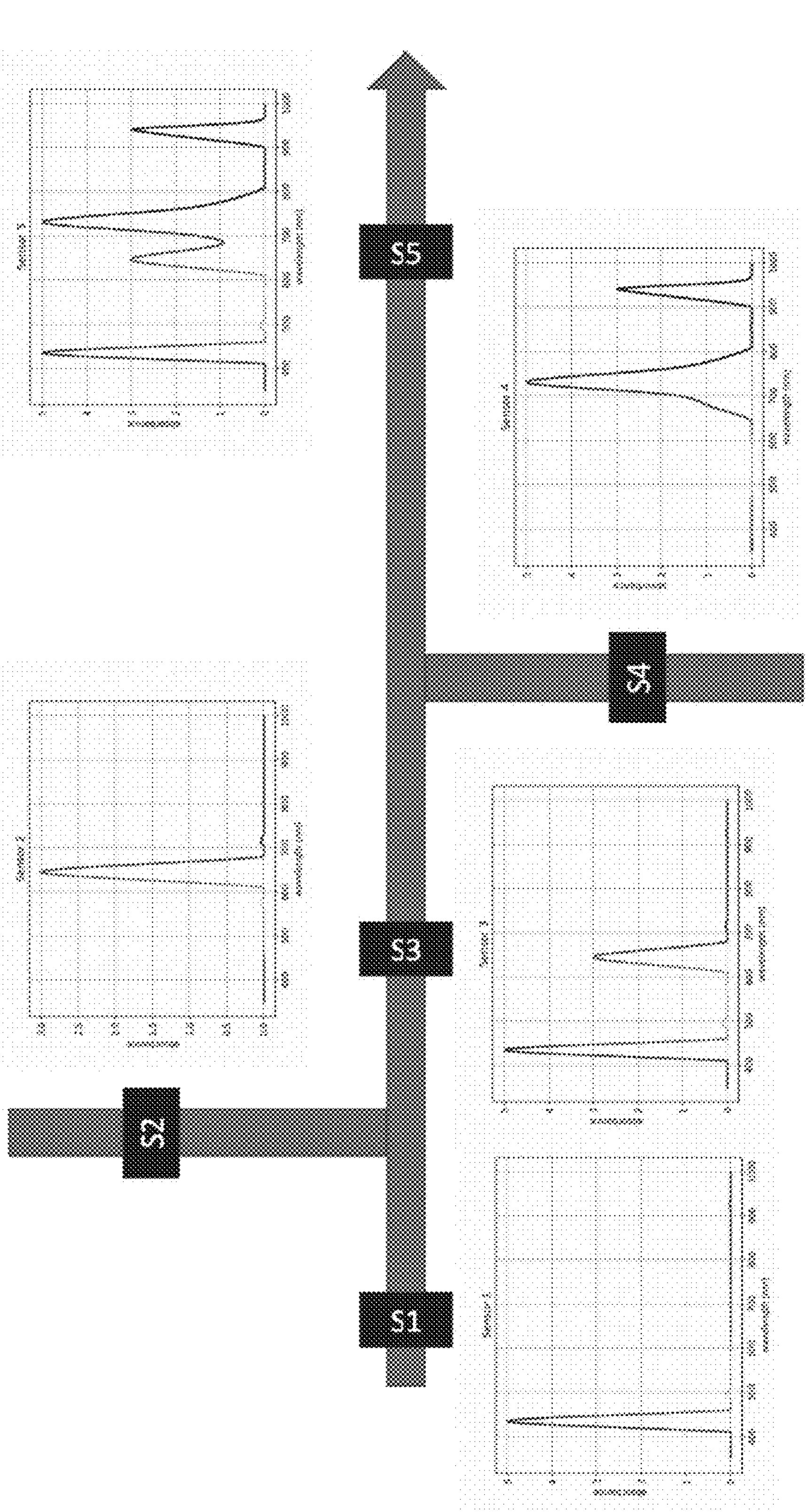

In a drainage system, process line, piping system, or a similar system, compounds from different sources and locations can come together to become a mixture. By measuring the spectra of the samples both upstream and downstream, the composition of the mixture can be deduced. FIG. 3B shows the spectral data collected by sensor S1 (corresponding to compound A), sensor S2 (corresponding to compound B), sensor S3 (corresponding to a mixture of compounds A and B), sensor S4 (corresponding to compound C), and sensor S5 (corresponding to a mixture of compounds A, B, and C). If only sensor S5 was deployed, it would be difficult to identify whether the sample is of a single compound or a mixture of compounds. However, with the support of data from other sensors upstream, it can be determined that the sample measured by sensor S5 is a mixture of three compounds. The spectral data can be obtained from scattering measurements (e.g., reflection, transmission, absorbance, fluorescence, or phosphorescence measurements). Furthermore, it can be determined that compounds A and B became mixed at a location upstream from sensor S3 and compounds A, B, and C became mixed at a location upstream from sensor S5. Further, information about the timing at which the mixing occurred may be inferred based on the timestamp of the data. In some embodiments, the spectra depicted in FIG. 3B are defined at the same time interval. That is, the spectra represent measurements taken within the same time interval but at different locations of a system.

Comparing the outputs of the sensors as discussed above may be used to determine the presence or absence of a particular substance at a certain location of a system. Additionally, comparing the outputs of the sensors may be used to determine a parameter of the fluid, including for example a concentration, a color, a turbidity, a composition, a cleanliness, particle size of a target substance.

Figure 3C:
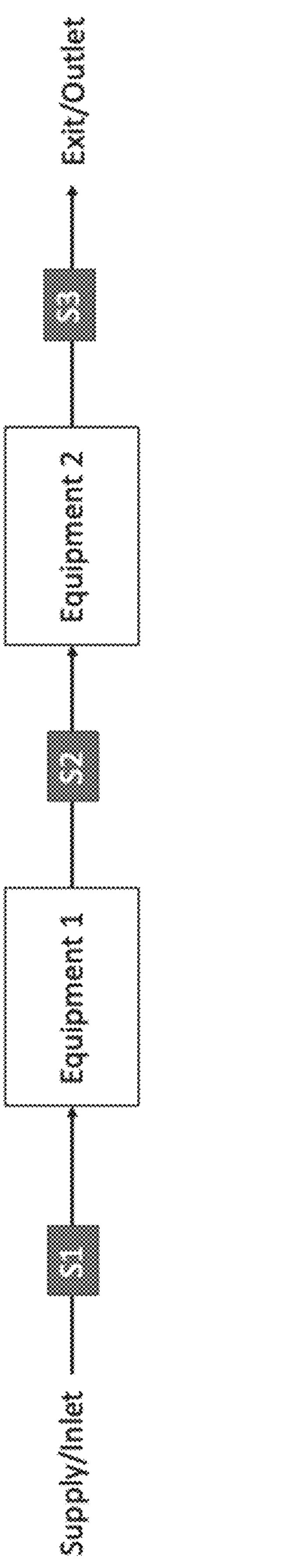

FIG. 3C is a schematic diagram of an apparatus where sensors are placed throughout a process line where there is an inlet where material is supplied in and an outlet where materials exits. By comparing data from sensors deployed throughout the apparatus, product quality and deviation can be detected, as well as for when product changeover occurs. For example, when product A supplied to the apparatus for processing is switched to product B, the sensors will be able to give insight to determine when product A has switched to product B at what locations in the process line. FIG. 3C can be any apparatus where fluid enters and exits. It can be a tank, a truck, a pipe, a pasteurizer, a reactor, a pit, a tub etc.

V. Anti-Fouling Techniques

The inventors have recognized and appreciated that liquid samples and materials can foul a sensor. For example, built up of material can cover the sensor, thus preventing the sensor from taking accurate readings. In addition, allowing the system to accumulate built up material increases maintenance costs and labor. To prevent fouling of sensors, the inventors have developed a self-cleaning apparatus arranged to keep the sensors clean.

In some embodiments, the liquid to be sampled can be routed or pumped from the source (e.g., a tank, pipe, container, liquid body, etc.) into a measurement chamber where a sensor can take a reading. After a reading is taken, the liquid sample may be routed or pumped outside the measurement chamber. Subsequently, the measurement chamber may be cleaned and then kept in clean water or air, or in a cleaning solution. In some embodiments, a jet of water, cleaning solution or air may be used to keep the measurement chamber clean. Alternatively, or additionally, a wiper system may be used. Other embodiments involve ultrasonic waves, ultraviolet radiation, pulsed electric fields, and/or electro-chlorination cleaning system to keep the measurement chamber clean. These systems can be activated to clean the sensor and/or to remove any biomaterials automatically, for example periodically or when drifting is detected. This cleaning process could also be activated after each measurement or after a predetermined set of measurements. When another reading needs to be taken, a clean storage solution (e.g., water or cleaning solution) may be pumped out and another sample may be drawn from the liquid source. This measurement apparatus keeps the sensors in a clean stable condition for most of the time and only introduces contaminated or corrosive liquid source to the sensors for a short amount of time, after which the sensors are self-cleaned, greatly increasing sensor lifetime before maintenance. The order of cleaning and pumping the sample out of the measurement chamber can be modified.

Figure 4:
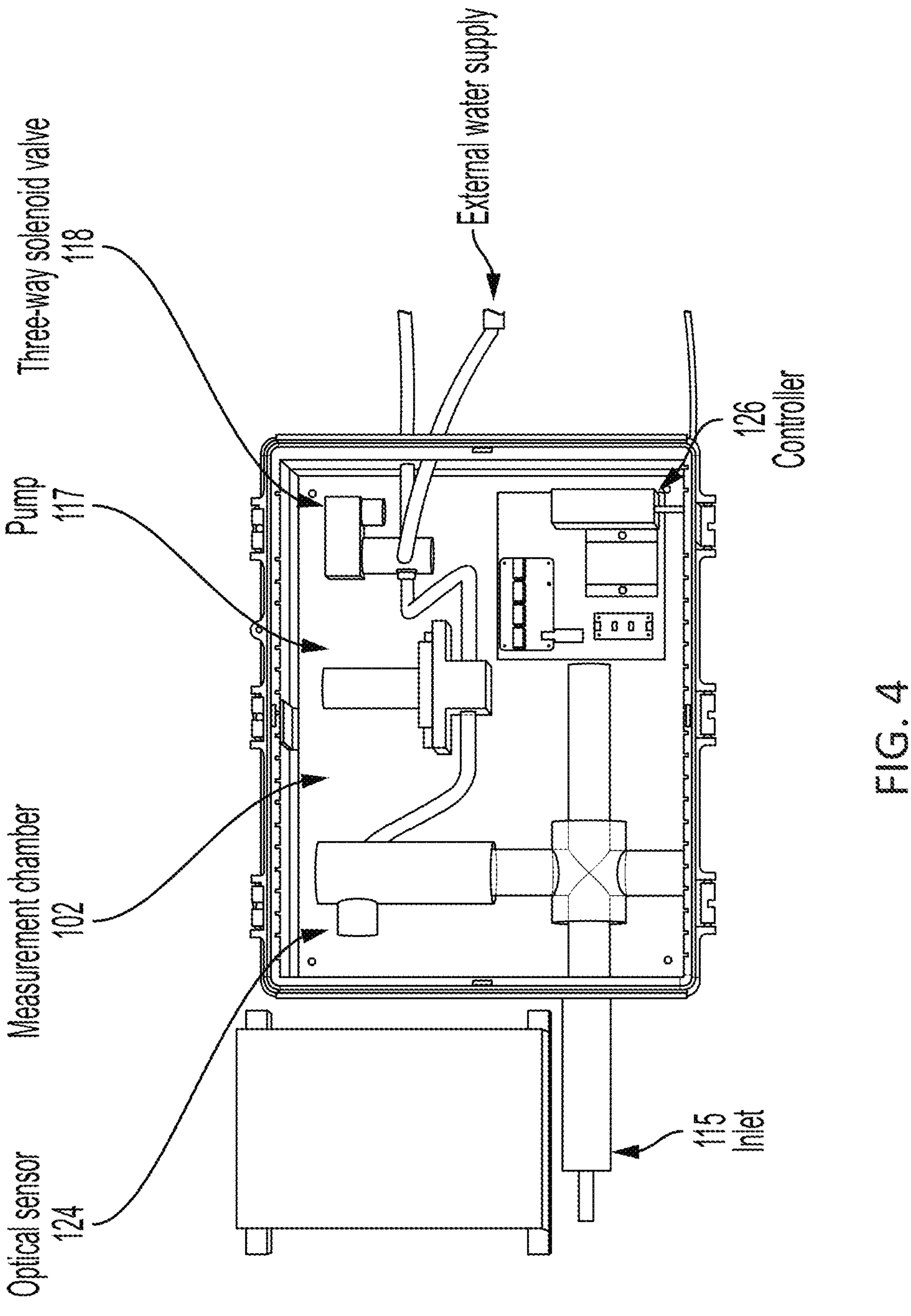
FIG. 4 is a schematic diagram of a representative self-cleaning optical monitoring apparatus, in accordance with some embodiments of the technology described herein.

FIG. 4 illustrates an example of a self-cleaning measurement chamber, in accordance with some embodiments. Measurement chamber 102 includes an optical sensor 124, a controller 126, a pump 117 and a three-way solenoid valve 118. Inlet 115 allows the liquid to be sampled to enter and exit the measurement chamber. An external water supply is connected to valve 118 and allows clean water to enter the chamber for purposes of keeping the measurement chamber clean.

Figures 5A, 5B, 5C:
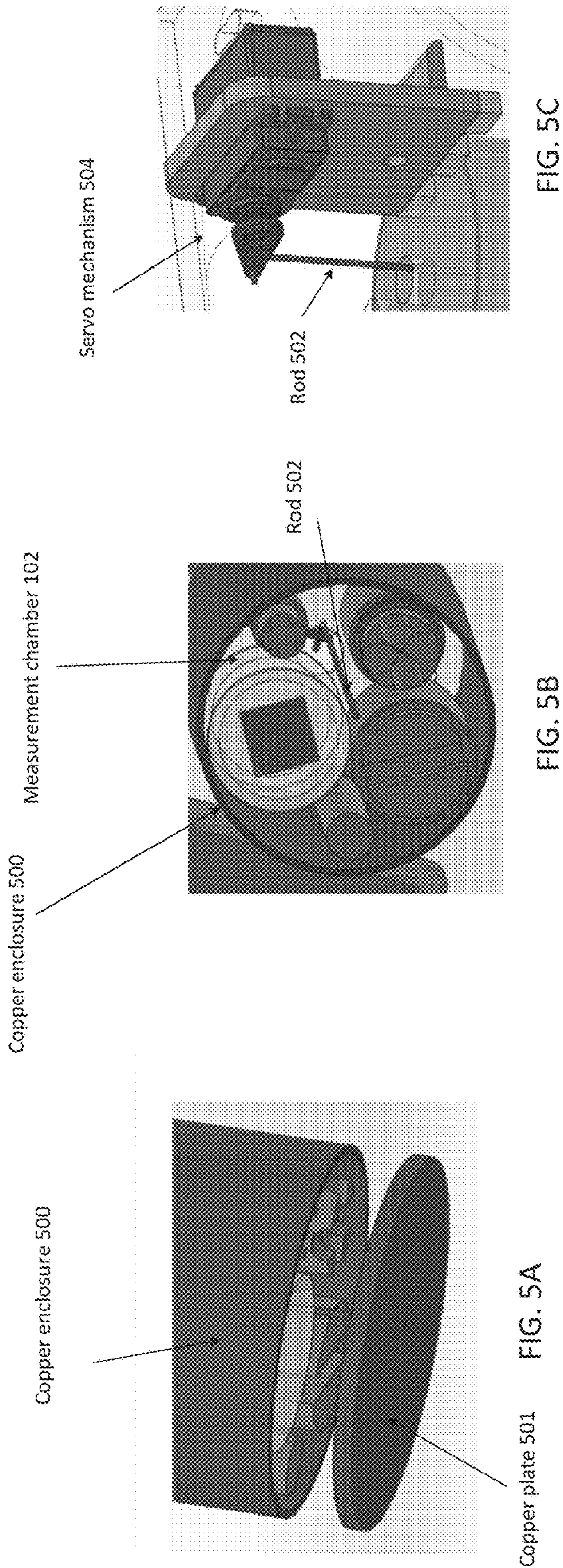
FIGS. 5A-5C are schematic diagrams of a representative optical monitoring apparatus including a copper enclosure, in accordance with some embodiments of the technology described herein.

The inventors have further recognized that accumulation of bio-growth can degrade the ability of a sensor to take accurate measurements. To prevent the accumulation of bio-growth, in some embodiments, a measurement chamber can include a copper encasing intended to create a copper ion-rich environment. In some circumstances, a copper ion-rich environment can prevent accumulation of bio-growth. An example of a copper enclosure is illustrated in FIG. 5, in accordance with some embodiments.

In this design, one or more optical sensors are kept in a copper enclosure 500 that encloses a measurement chamber 102. Copper ions generated from the copper enclosure diffuse into the fluid surrounding the optical sensor(s), thereby preventing the formation of bio-growth. A rod 502 is attached to a copper plate 501 on the bottom side of the chamber. The rod is attached to a servo mechanism 504. The servo mechanism causes the rod to move the copper plate, thereby opening the copper enclosure and allowing the fluid sample to enter or exit the chamber. The copper plate can be pushed up and down a few times to flush the liquid inside the copper enclosure before a new reading is taken. After the readings are taken from the sensor(s), the copper plate may be pulled back up, thus closing the copper enclosure again. Other similar biofouling prevention methods can also be implemented. For example, a pump can be added into a copper enclosure to cycle water/liquid in and out of the copper enclosure when a reading is needed to be taken. It should be noted that the copper enclosures described herein are not limited to use in connection with optical sensors, but may also be used to prevent fouling to chemical sensors as well as other types of sensors.

Data collected by sensors may be used to provide warnings on changes in liquid composition, measurement color and composition in liquid samples, as well as optimize processes, cleaning, and treatment.

Data can be combined with microscopy and microbiological data as well as other external data. This data can be used to train models and run through an algorithm to optimize treatment, production process, cleaning, maintenance, as well as prevent microbial outbreaks, prevent chemical corrosion and scaling, etc.

VI. Mechanical Attachments

The inventors have developed mechanical attachments that enable fluid sampling without having to route the fluid to a dedicated sampling location. The attachments developed by the inventors can be installed and uninstalled without having to disrupt an existing flow or the operations of the system to be analyzed, and without having to add to, change, break or remove existing pipes.

Figure 6A:
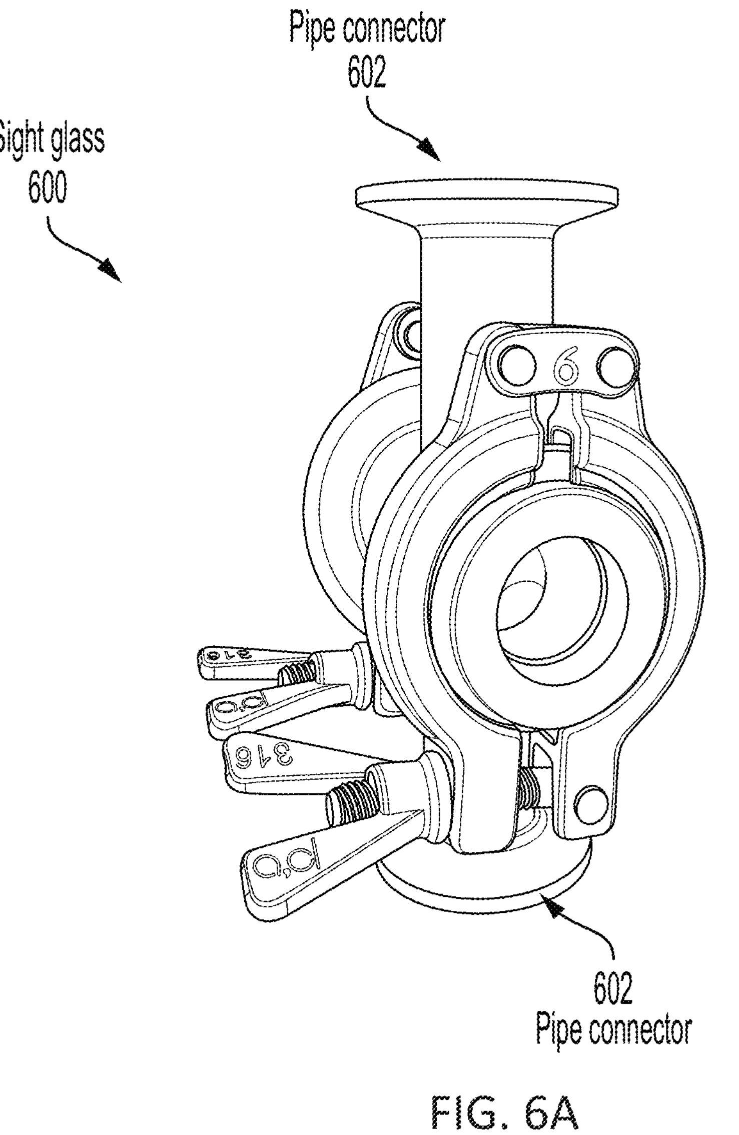
FIGS. 6A-6F are schematic diagrams illustrating a representative housing of an optical monitoring apparatus, in accordance with some embodiments of the technology described herein.
Figure 6B:
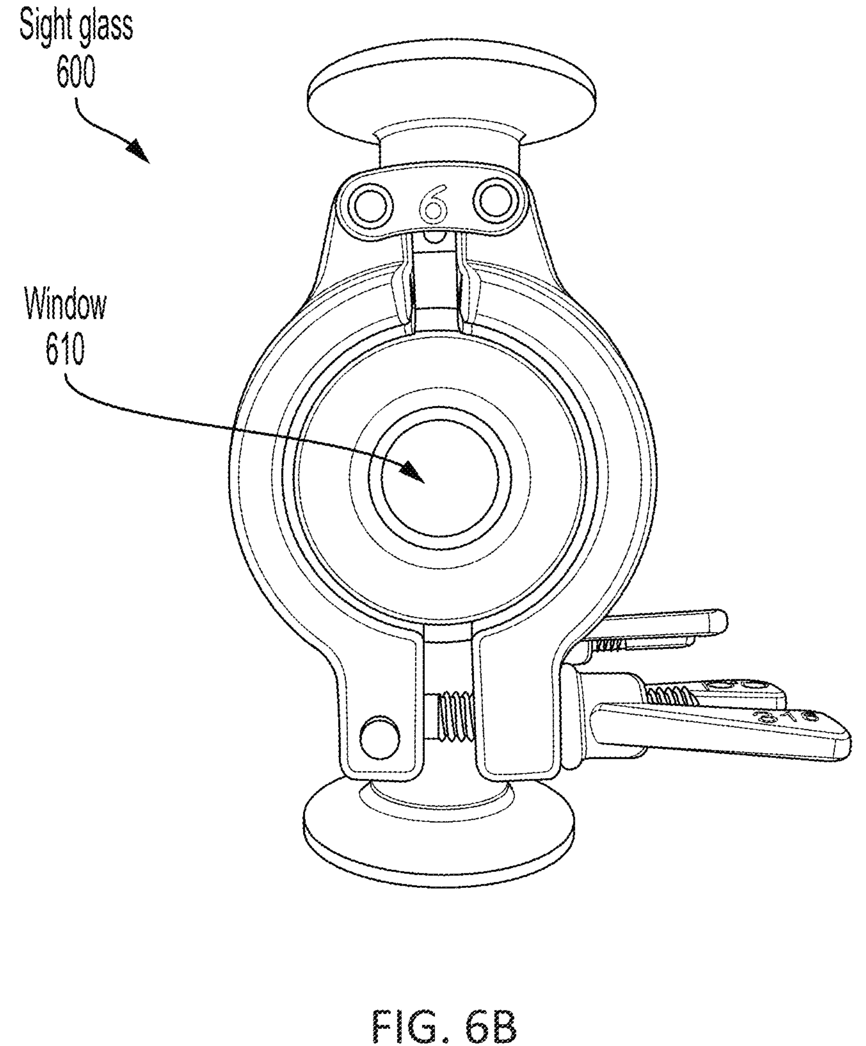

Such attachments may be used in conjunction with sight glasses-transparent sections of pipes that allow visual observation of a fluid. Sight glasses are often used in piping systems where it is necessary to observe a flow. Sight glasses are typically used by operators to observe the fluid flow direction, the color of a fluid, the level of a fluid inside a tank, and to estimate the flow rate. An example of a sight glass is illustrated in FIGS. 6A-6B, in accordance with some embodiments. FIG. 6A is a perspective view and FIG. 6B is a side view of a sight glass 600. This sight glass includes a pair of opposite pipe connectors 602, which enable the sight glass to be connected with a pipe in-line. A pair of windows 610 are disposed between the pipe connectors 602. The windows 610 are disposed on opposite sides of the mechanism, thereby allowing visual inspection of the fluid that passes through it. The windows are made of glass or other transparent materials. In other designs, a window may be shaped cylindrically, thereby wrapping around the perimeter of the sight glass and allowing visual inspection from any angle.

Figure 6C:
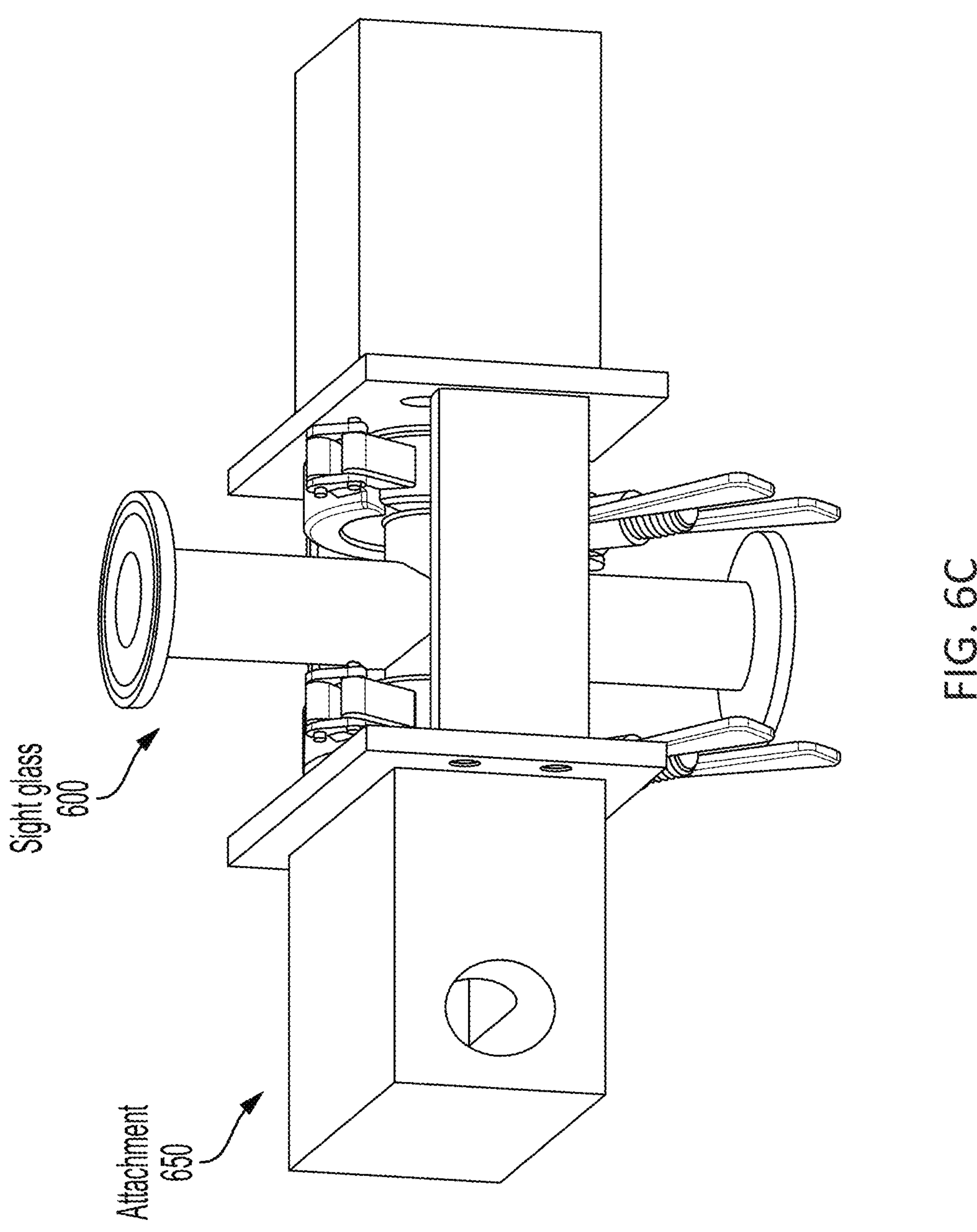

An example of a mechanical attachment is illustrated in FIGS. 6C-6F, in accordance with some embodiments. In the depiction of FIG. 6C, attachment 650 can be removably attached to sight glass 600. For example, attachment 650 may include a mechanism that, when latched, causes the attachment to be pressed against the sight glass and to form a firm connection. In some embodiments, attachment 650 surrounds a section of sight glass 650 completely when attached to it. Attachment 650 can be attached to a sight glass removably in that the manner by which it attaches to the sight glass is not permanent and can be easily undone (e.g., without having to interrupt the flow through the sight glass).

Figure 6D:
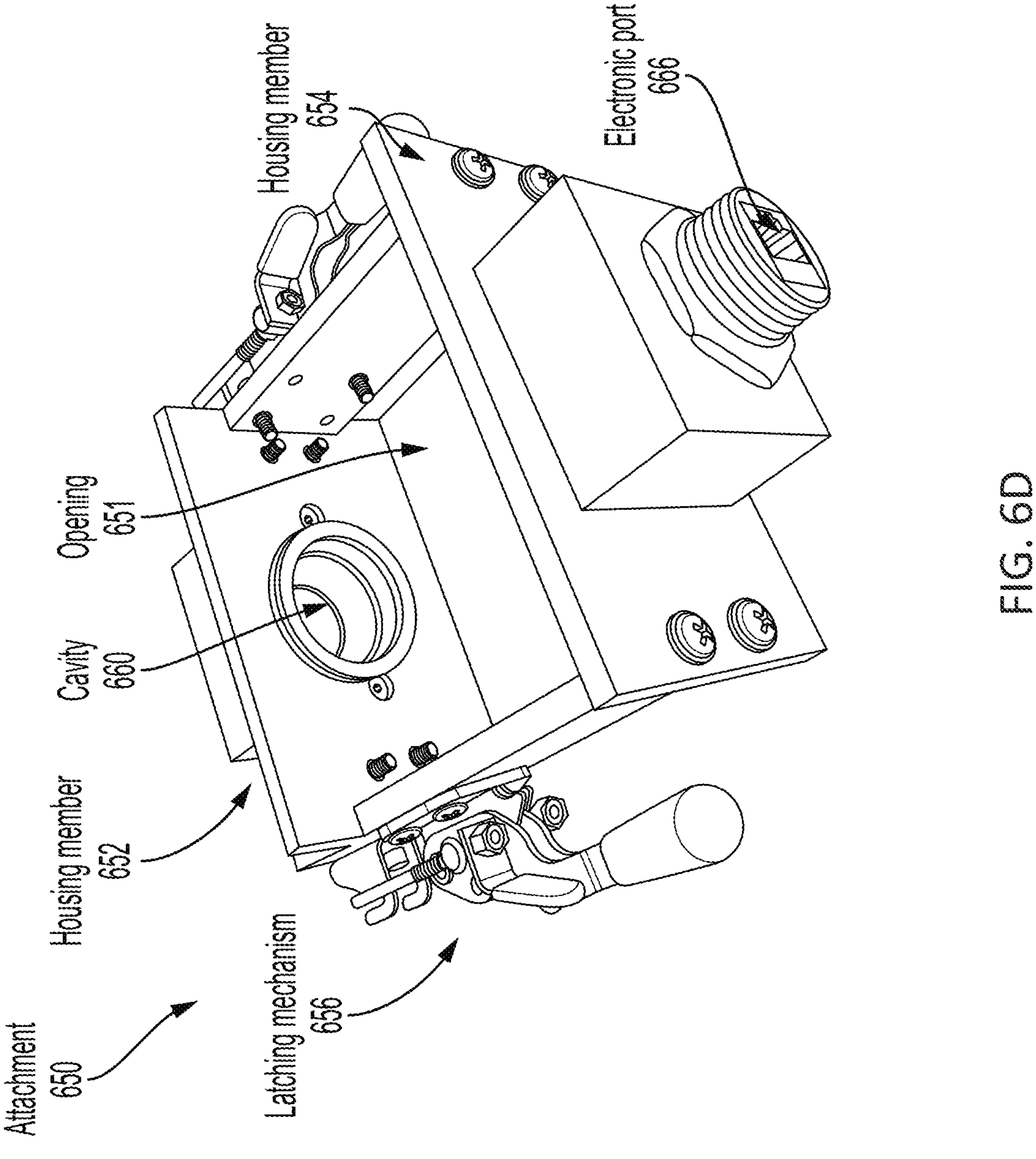
Figure 6E:
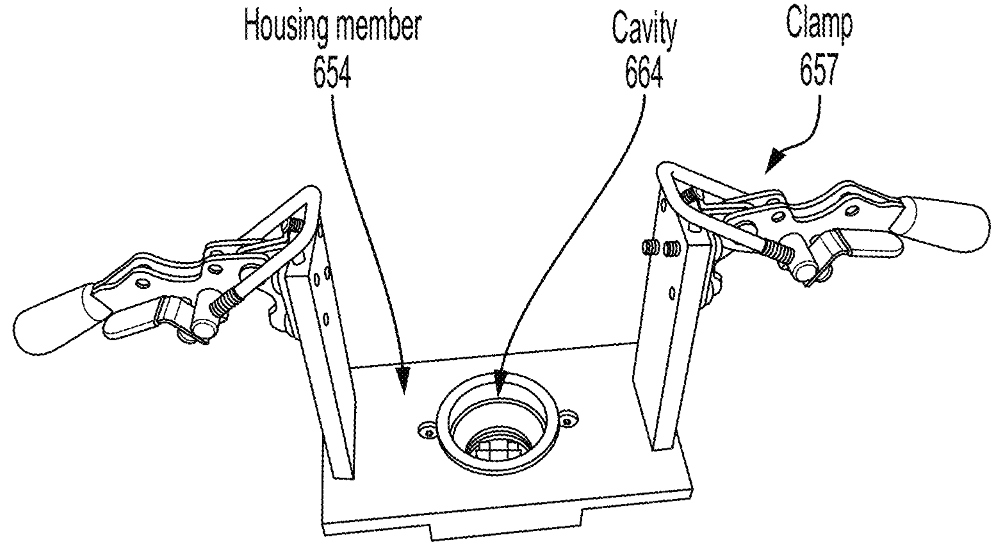
Figure 6F:
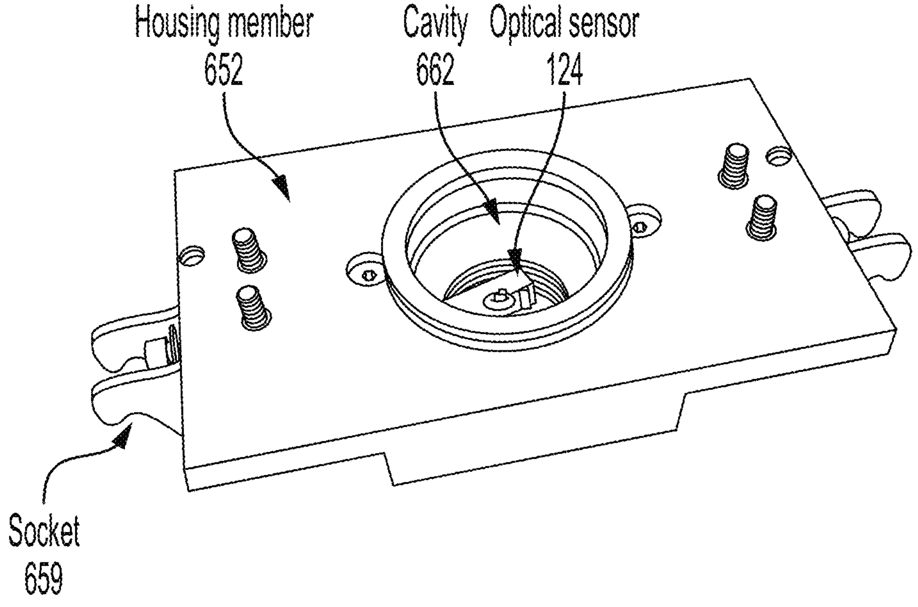

FIG. 6D depicts an attachment 650 when not attached to a sight glass. In this example, the attachment includes a housing defining an opening 651 through it. The opening is shaped to provide sufficient space for a sight glass. In this example, opening 651 is shaped as a square, though other shapes are also possible (e.g., rectangular, circular, elliptical, etc.). The attachment housing includes housing members 652 and 654 and latching mechanism 656, which latches the housing member to one another. It should be noted that an attachment may include more than two housing members configured to be latched to one another, in some embodiments. Housing member 652 defines a cavity 660, which provides sufficient space to host an optical sensor 124, and optionally other electronic circuits including controller 126.

Latching mechanism 656 may include any type of hardware configured to latch the housing member to one another, including clamps, screws, bolts, latches, hooks, spring-loaded devices, etc. The attachment depicted in FIGS. 6E-6F includes a clamp 657 attached to housing member 654 and a socket 659 attached to housing member 652. The clamp may be arranged to be secured to socket 659.

Both the sensor's optical source and optical detector may be aligned with a respective window of the sight glass, thereby providing a clear line of sight with respect to the fluid to be analyzed. In some embodiments, both the optical source and the optical detector may be placed inside cavity 662. In this arrangement, the optical detector detects light that is transmitted by the optical source and reflected from the fluid (passing through the sight glass). In other arrangements, it may be desirable to detect light that is transmitted through the fluid. In these arrangements, the optical detector may be disposed on the opposite side of the housing. For example, an optical detector may be disposed in a cavity 664 defined in housing member 654, whereas the optical source may be disposed in a cavity 662 defined in housing member 652. Hybrid arrangements are also possible, such that a first optical detector is disposed in the same cavity as the optical source to capture reflected light and a second optical detector is disposed in the opposite cavity to capture transmitted light.

Figure 7A:
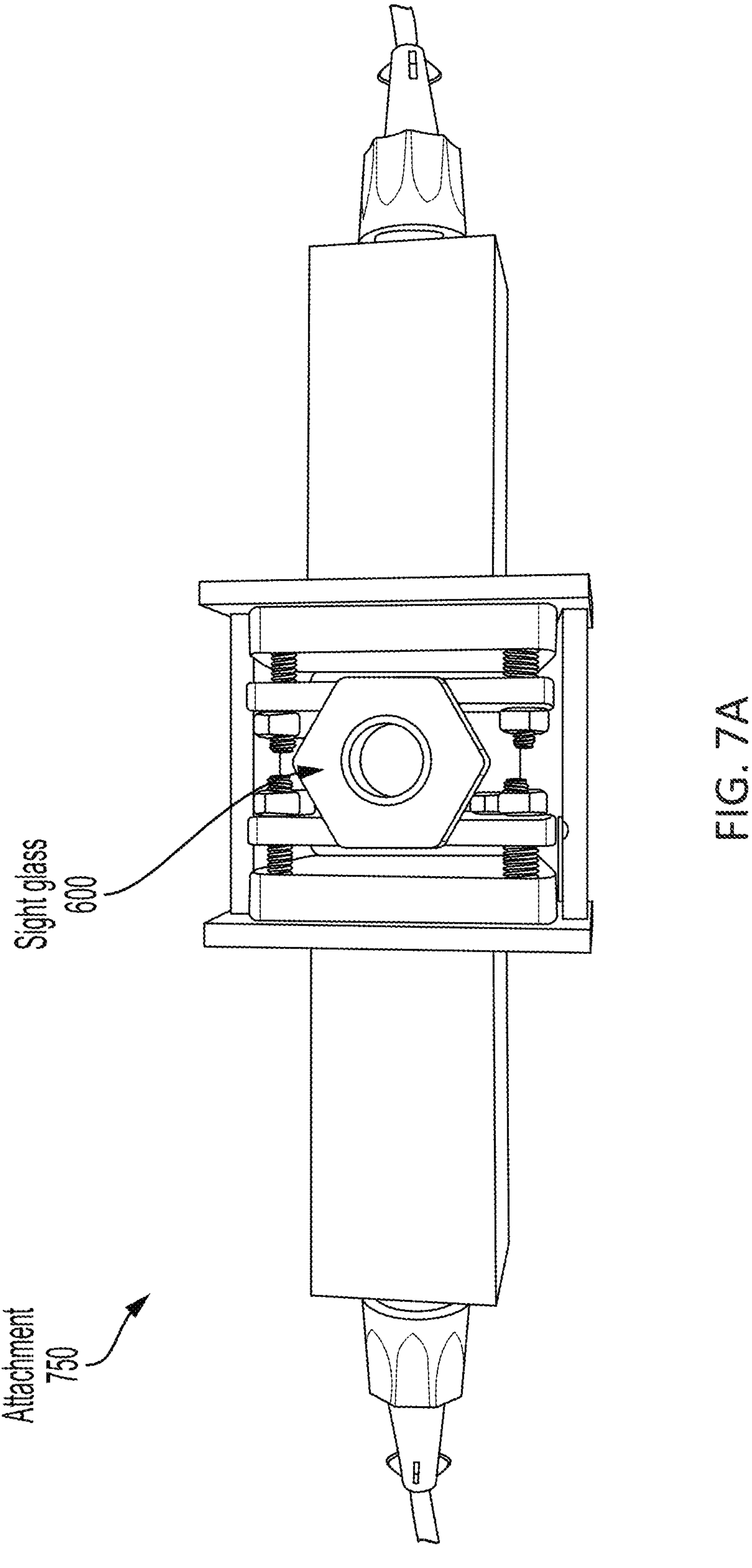
FIGS. 7A-7C are schematic diagrams illustrating another representative housing of an optical monitoring apparatus, in accordance with some embodiments of the technology described herein.
Figure 7C:
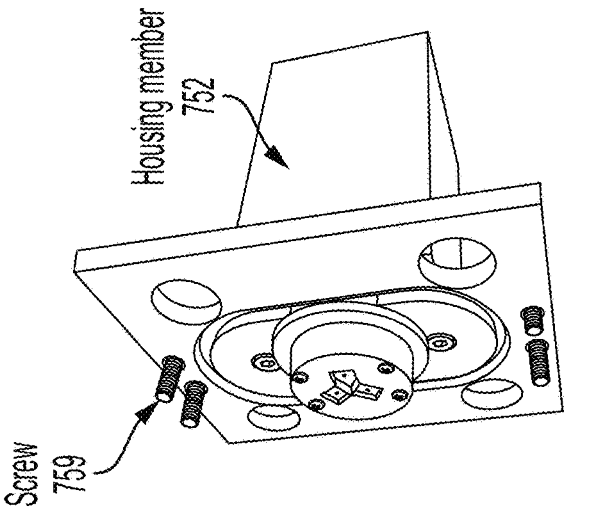
Figure 7B:
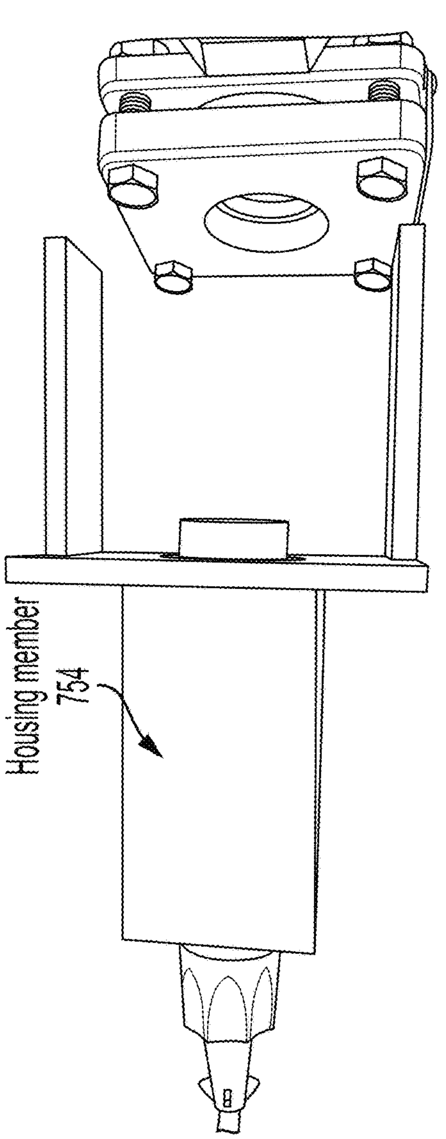

FIGS. 7A-7C depict another illustrative attachment configured to be removably attached to a sight glass 600, in accordance with some embodiments. In this implementation, attachment 750 includes a housing member 754 configured to attach to a housing member 752 via screws 759. As in the example of FIGS. 6A-6F, attachment 750 is pressed against the sight glass when the housing members are latched to each other with the sight glass passing between the housing members.

Figure 8:
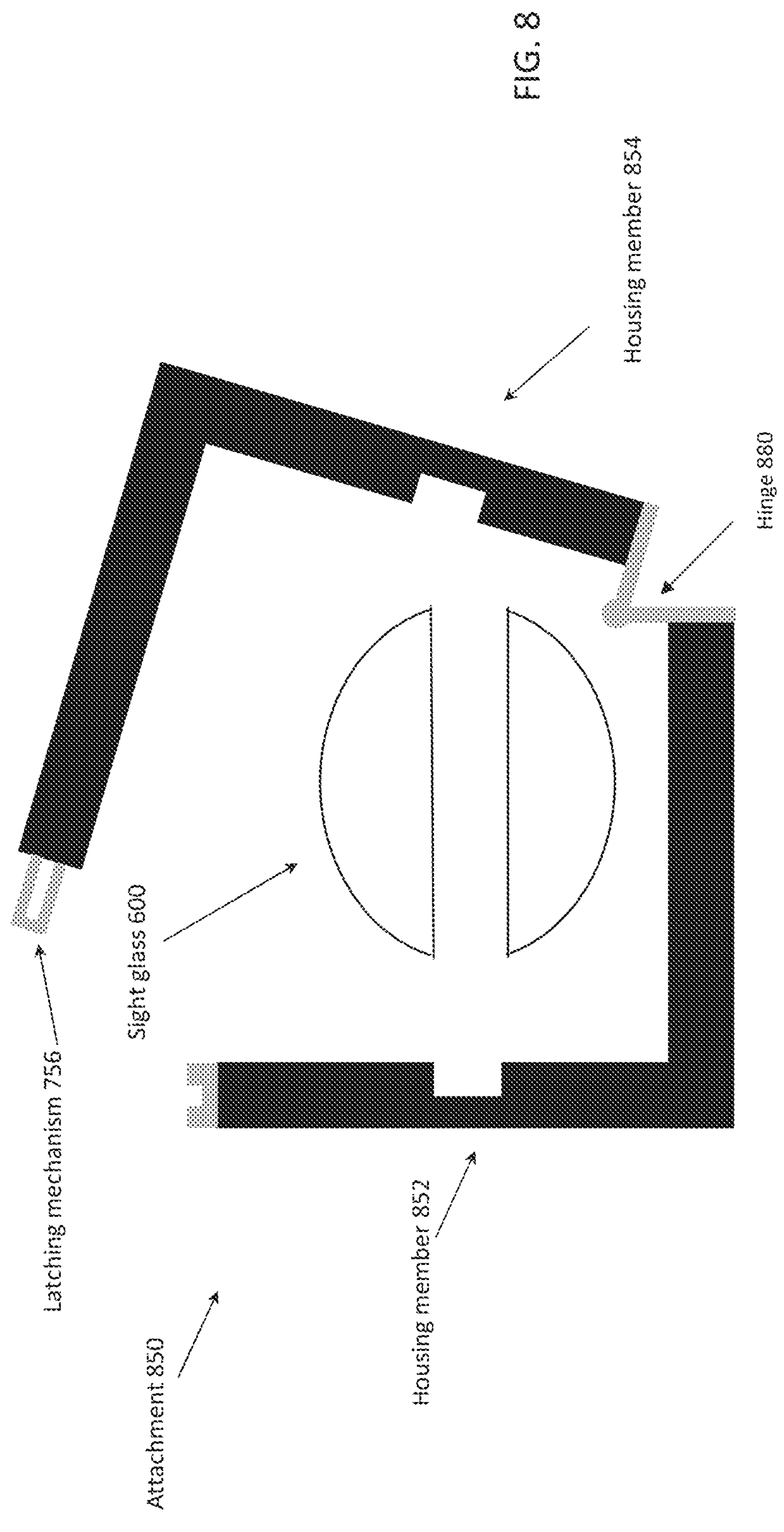
FIG. 8 is a schematic diagram illustrating yet another representative housing of an optical monitoring apparatus, in accordance with some embodiments of the technology described herein.

FIG. 8 depicts yet another illustrative attachment configured to be removably attached to a sight glass 600, in accordance with some embodiments. In this implementation, attachment 850 includes a housing member 854 hingedly connected to a housing member 852. In other words, a hinge 880 connects the housing member together at one side of the attachment. On the other side of the attachment, a latching mechanism 756 allows the housing members to latch to each other and to press the attachment against a sight glass.

Figure 9A:
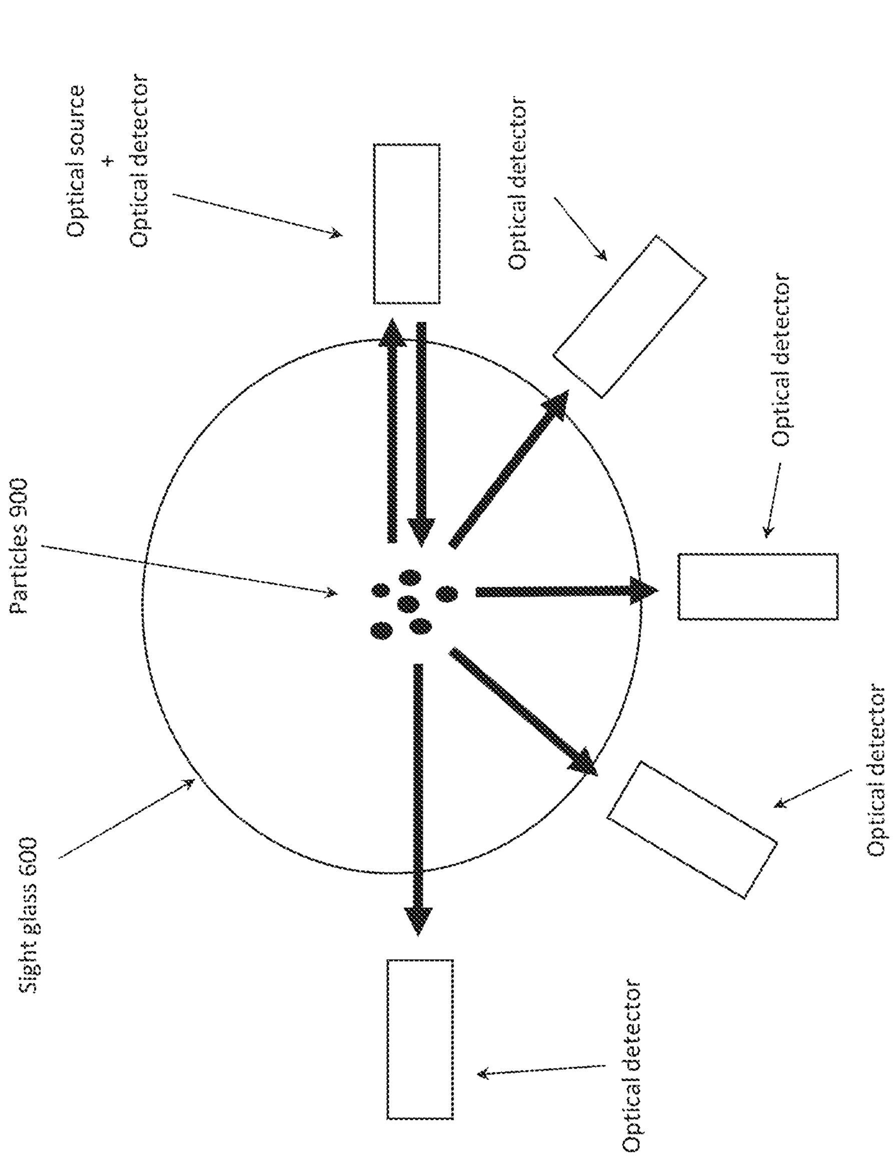
FIGS. 9A-9B are schematic diagrams illustrating optical monitoring apparatus including multiple optical detectors and/or multiple optical sources angularly offset relative to one another, in accordance with some embodiments of the technology described herein.
Figure 9B:
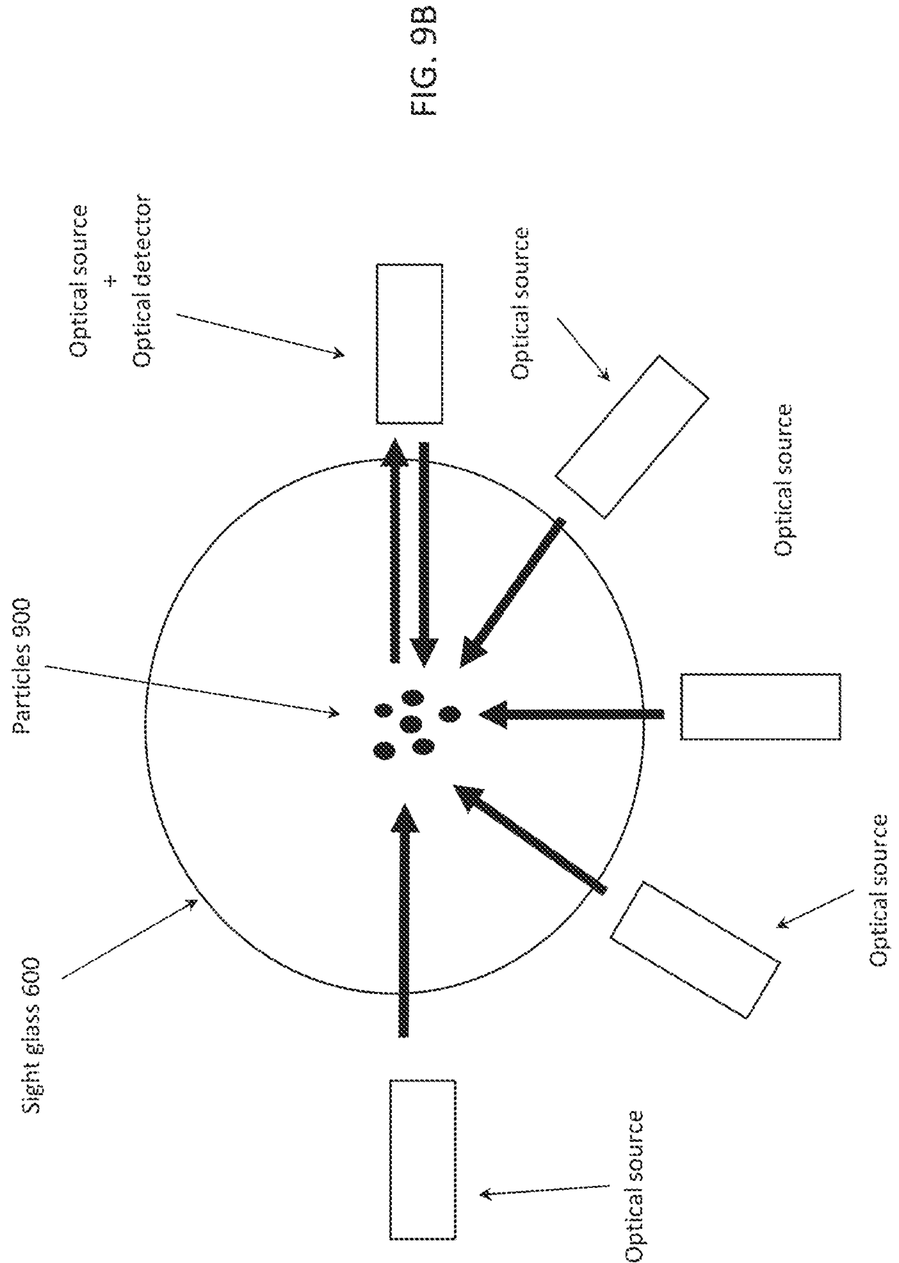

As discussed above, in some circumstances it is desirable to capture light reflected from a fluid and in other circumstances it is desirable to capture light transmitted through a fluid, depending on the nature of the fluid. In other circumstances, it is desirable to capture both the reflected light and the transmitted light. In yet other circumstances, it may be desirable to capture light scattered at angles other than 0 and 180 degrees. Scattering from particles may in fact occur at angles that are dependent upon the size of the scattering particles. The diagram of FIG. 9A illustrates an apparatus including an optical source and multiple optical detectors located at different angular positions with respect to the optical source. An optical detector offset by 0 degrees relative to the optical source captures reflected light. An optical detector offset by 180 degrees relative to the optical source captures transmitted light. An optical detector offset by 90 degrees relative to the optical source captures light scattered from particles having a certain size. An optical detector offset by 45 degrees relative to the optical source captures light scattered from particles having another size. Another version of the apparatus as seen in FIG. 9B can be of multiple optical sources at different angles from a single or number of optical sensors. In some embodiments, the size of the particles present in a fluid may be inferred based on which among a plurality of angularly offset optical detector detect(s) light.

What is claimed is:

1. A method of operating a clean-in-place (CIP) apparatus configured to perform a cleaning routine on equipment, the cleaning routine comprising a plurality of cleaning stages, the method comprising:

receiving first data from one or more sensors coupled to the equipment by a fluid carrier configured to support passage of fluid, wherein the first data represent measurements on the fluid performed by the one or more sensors;

processing the first data to determine second data indicative of a characteristic of the fluid; and controlling the CIP apparatus in real time as the CIP apparatus performs a first cleaning stage of the plurality of cleaning stages on the equipment, wherein controlling the CIP apparatus comprises causing the CIP apparatus to stop the first cleaning stage based on the second data indicative of the characteristic of the fluid.

2. The method of claim 1, wherein controlling the CIP apparatus further comprises causing the CIP apparatus to initiate a second cleaning stage of the plurality of cleaning stages upon completion of the first cleaning stage.

3. The method of claim 1, further comprising determining whether the fluid is deemed to be sufficiently clean based on the second data indicative of the characteristic of the fluid, wherein controlling the CIP apparatus comprises causing the CIP apparatus to stop the first cleaning stage if the fluid is deemed to be sufficiently clean.

4. The method of claim 3, wherein determining whether the fluid is deemed to be sufficiently clean comprises comparing the second data to a threshold value.

5. The method of claim 1, wherein controlling the CIP apparatus comprises causing the CIP apparatus to stop the first cleaning stage upon passage of a margin of error of additional wash time.

6. The method of claim 1, wherein controlling the CIP apparatus comprises overriding a time-based execution of the first cleaning stage.

7. The method of claim 1, wherein the one or more sensors comprise optical sensors, and wherein the first data represent optical measurements on the fluid performed by the one or more optical sensors.

8. The method of claim 1, wherein the one or more sensors comprise a first sensor positioned upstream from the equipment and a second sensor positioned downstream from the equipment, and wherein the first data represent a change in a characteristic of the fluid as passing through the first sensor and the fluid as passing through the second sensor.

9. The method of claim 1, wherein processing the first data to determine second data indicative of the characteristic of the fluid comprises determining whether the fluid contains a target substance.

10. The method of claim 1, wherein the characteristic of the fluid comprises at least one selected from the group consisting of a concentration of a target substance, a color of the fluid, a turbidity of the fluid, a composition of the fluid, and a cleanliness of the fluid.

11. A system for operating a clean-in-place (CIP) apparatus configured to perform a cleaning routine on equipment, the cleaning routine comprising a plurality of cleaning stages, the system comprising:

one or more sensors coupled to the equipment by a fluid carrier configured to support passage of fluid, wherein the one or more sensors are configured to generate first data representing measurements on the fluid;

a controller configured to:

process the first data to determine second data indicative of a characteristic of the fluid; and control the CIP apparatus in real time as the CIP apparatus performs a first cleaning stage of the plurality of cleaning stages on the equipment, wherein controlling the CIP apparatus comprises causing the CIP apparatus to stop the first cleaning stage based on the second data indicative of the characteristic of the fluid.

12. The system of claim 11, wherein controlling the CIP apparatus further comprises causing the CIP apparatus to initiate a second cleaning stage of the plurality of cleaning stages upon completion of the first cleaning stage.

13. The system of claim 11, wherein the controller is further configured to determine whether the fluid is deemed to be sufficiently clean based on the second data indicative of the characteristic of the fluid, wherein controlling the CIP apparatus comprises causing the CIP apparatus to stop the first cleaning stage if the fluid is deemed to be sufficiently clean.

14. The system of claim 13, wherein determining whether the fluid is deemed to be sufficiently clean comprises comparing the second data to a threshold value.

15. The system of claim 11, wherein controlling the CIP apparatus comprises causing the CIP apparatus to stop the first cleaning stage upon passage of a margin of error of additional wash time.

16. The system of claim 11, wherein the one or more sensors comprise optical sensors, and wherein the first data represent optical measurements on the fluid performed by the one or more optical sensors.

17. The system of claim 11, wherein the one or more sensors comprise a first sensor positioned upstream from the equipment and a second sensor positioned downstream from the equipment, and wherein the first data represent a change in a characteristic of the fluid as passing through the first sensor and the fluid as passing through the second sensor.

18. The system of claim 11, wherein processing the first data to determine second data indicative of the characteristic of the fluid comprises determining whether the fluid contains a target substance.

19. The system of claim 11, wherein the characteristic of the fluid comprises at least one selected from the group consisting of a concentration of a target substance, a color of the fluid, a turbidity of the fluid, a composition of the fluid, and a cleanliness of the fluid.

20. The system of claim 11, further comprising a housing removably attachable to the fluid carrier in correspondence with a sight glass, wherein the housing defines a first cavity, wherein at least one sensor of the one or more sensors is disposed in the first cavity of the housing and is aligned with the sight glass.

21. The system of claim 20, wherein the housing comprises a first housing member, a second housing member, and a latching mechanism configured to latch the first housing member to the second housing member.

22. The system of claim 11, wherein controlling the CIP apparatus comprises overriding a time-based execution of the first cleaning stage.

* * * * *